(12) United States Patent
Chiba et al.

(10) Patent No.: US 10,148,563 B2
(45) Date of Patent: Dec. 4, 2018

(54) COMMUNICATION SYSTEM, COMMUNICATION APPARATUS, CONTROL APPARATUS, NETWORK DEVICE, COMMUNICATION METHOD, CONTROL METHOD, AND PROGRAM

(71) Applicant: NEC Corporation, Tokyo (JP)

(72) Inventors: Yasunobu Chiba, Tokyo (JP); Kazushi Sugyou, Tokyo (JP)

(73) Assignee: NEC CORPORATION, Tokyo (JP)

( * ) Notice: Subject to any disclaimer, the term of this patent is extended or adjusted under 35 U.S.C. 154(b) by 195 days.

(21) Appl. No.: 14/908,971

(22) PCT Filed: Jul. 25, 2014

(86) PCT No.: PCT/JP2014/003940
§ 371 (c)(1),
(2) Date: Jan. 29, 2016

(87) PCT Pub. No.: WO2015/015786
PCT Pub. Date: Feb. 5, 2015

(65) Prior Publication Data
US 2016/0173369 A1    Jun. 16, 2016

(30) Foreign Application Priority Data
Jul. 30, 2013    (JP) .................................. 2013-157943

(51) Int. Cl.
*H04L 12/24*        (2006.01)
*H04L 12/723*       (2013.01)
(Continued)

(52) U.S. Cl.
CPC ............ *H04L 45/50* (2013.01); *H04L 12/185* (2013.01); *H04L 12/40013* (2013.01);
(Continued)

(58) Field of Classification Search
CPC ............ H04L 12/185; H04L 12/40013; H04L 41/0816; H04L 41/0893; H04L 41/5003;
(Continued)

(56) References Cited

U.S. PATENT DOCUMENTS 6,873,618 B1 * 3/2005 Weaver ............... H04L 12/1854
370/389
7,386,232 B1 * 6/2008 Cauchy ............... H04J 14/0227
398/45
(Continued)

FOREIGN PATENT DOCUMENTS

JP    2012-161089 A    8/2012

OTHER PUBLICATIONS

International Search Report (ISR) (PCT Form PCT/ISA/210), in PCT/JP2014/003940, dated Nov. 4, 2014.
(Continued)

*Primary Examiner* — Robert J Lopata
(74) *Attorney, Agent, or Firm* — McGinn I.P. Law Group, PLLC.

(57) ABSTRACT

A technique capable of changing communication services that can be provided by a communication system is provided. A communication system according to the present invention includes: first means that is capable of executing a network function for providing a communication service; and second means that adds second identification information corresponding to first identification information that is assigned to a group of network functions, to a packet belonging to the group, and sends the packet to the network function, which performs packet forwarding within the group based on the second identification information.

40 Claims, 39 Drawing Sheets

(51) Int. Cl.
  *H04L 12/40* (2006.01)
  *H04L 12/18* (2006.01)
  *H04L 29/12* (2006.01)

(52) U.S. Cl.
  CPC ...... *H04L 41/0816* (2013.01); *H04L 41/0893* (2013.01); *H04L 61/2069* (2013.01); *H04L 61/35* (2013.01); *H04L 41/5003* (2013.01)

(58) Field of Classification Search
  CPC ..... H04L 45/50; H04L 61/2069; H04L 61/35; H04L 12/18; H04L 45/16; H04L 49/201
  USPC .......................................................... 370/390
  See application file for complete search history.

(56) References Cited

U.S. PATENT DOCUMENTS

| | | | | |
|---|---|---|---|---|
| 8,514,756 | B1* | 8/2013 | Ramachandra | H04W 76/002 370/310 |
| 2002/0150114 | A1* | 10/2002 | Sainomoto | H04L 45/00 370/402 |
| 2003/0088696 | A1* | 5/2003 | McCanne | H04L 12/1836 709/238 |
| 2003/0177217 | A1* | 9/2003 | Asaka | H04L 41/00 709/223 |
| 2003/0231629 | A1* | 12/2003 | Banerjee | H04L 12/185 370/390 |
| 2005/0129019 | A1* | 6/2005 | Cheriton | H04L 63/0272 370/392 |
| 2007/0280210 | A1* | 12/2007 | Milstein | H04L 12/185 370/356 |
| 2008/0107126 | A1* | 5/2008 | Oguchi | H04L 41/0803 370/409 |
| 2010/0027453 | A1* | 2/2010 | LoGalbo | H04W 4/12 370/312 |
| 2010/0254385 | A1* | 10/2010 | Sharma | H04L 12/4633 370/392 |
| 2012/0092992 | A1* | 4/2012 | Pappas | H04L 47/2491 370/235 |
| 2014/0036721 | A1* | 2/2014 | Kihara | H04B 1/406 370/254 |
| 2014/0064275 | A1* | 3/2014 | Hammer | H04L 45/74 370/392 |
| 2014/0086237 | A1* | 3/2014 | Assarpour | H04L 49/201 370/355 |
| 2014/0119374 | A1* | 5/2014 | Balasubramanian | H04L 47/2441 370/392 |
| 2015/0078377 | A1* | 3/2015 | Wijnands | H04L 12/1886 370/390 |
| 2015/0156287 | A1* | 6/2015 | Itoh | H04L 45/38 370/392 |
| 2015/0271067 | A1* | 9/2015 | Li | H04L 45/50 370/392 |
| 2015/0341258 | A1* | 11/2015 | Itoh | H04L 45/38 370/389 |
| 2016/0112313 | A1* | 4/2016 | Niu | H04L 45/00 370/392 |
| 2016/0134541 | A1* | 5/2016 | Wang | H04L 12/6418 370/235 |
| 2016/0142293 | A1* | 5/2016 | Hu | H04L 45/38 370/392 |
| 2016/0164717 | A1* | 6/2016 | Wu | H04L 12/6418 370/225 |
| 2016/0182287 | A1* | 6/2016 | Chiba | H04L 61/25 709/220 |
| 2016/0234105 | A1* | 8/2016 | Li | H04L 47/00 |
| 2016/0344803 | A1* | 11/2016 | Batz | H04L 12/1407 |

OTHER PUBLICATIONS

Y. Jiang, An Architecture of Service Chaining, draft-jiang-service-chaining-arch-00.txt, [online], Jun. 27, 2013, [retrieved on Oct. 23, 2014]. Retrieved from the Internet <URL: http://tools.ietf.org/html/draft-jiang-service-chaining-arch-00>.

W. Liu et al., Service Chaining Use Cases, draft-liu-service-chaining-use-cases-01, [online], Jul. 15, 2013, [retrieved on Oct. 23, 2014]. Retrieved from the Internet <URL: http://tools.ietf.org/html/draft-liu-service-chaining-use-cases-01>.

* cited by examiner

FIG. 3

GROUP MANAGEMENT TABLE
110

| NW FUNCTION GROUP | NFs | PSEUDO NW ADDRESS (DESTINATION B) | PSEUDO NW ADDRESS (DESTINATION A) |
|---|---|---|---|
| GROUP (1) | NF(a), NF(b) | 10.0.0.0/24 | 10.1.0.0/24 |
| GROUP (2) | NF(c), NF(d), NF(b) | 10.0.1.0/24 | 10.1.1.0/24 |
| ... | | | |

FIG. 4

PACKET PROCESSING TABLE 111

| ORIGINAL ADDRESS | | DESTINATION ADDRESS AFTER TRANSLATION |
|---|---|---|
| SOURCE ADDRESS | DESTINATION ADDRESS | |
| 100.64.1.1 | 100.64.2.1 | 10.0.0.1 (PSEUDO ADDRESS) |
| 100.64.1.2 | 100.64.2.2 | 10.0.1.1 (PSEUDO ADDRESS) |
| ANY | 10.1.0.1 (PSEUDO ADDRESS) | 100.64.1.1 |
| ANY | 10.1.1.1 (PSEUDO ADDRESS) | 100.64.1.2 |
| ⋯ | | |

FIG. 5

PACKET PROCESSING TABLE 111

| ORIGINAL ADDRESS | | DESTINATION ADDRESS AFTER TRANSLATION |
|---|---|---|
| SOURCE ADDRESS | DESTINATION ADDRESS | |
| ANY | 100.64.1.1 | 10.1.0.1 (PSEUDO ADDRESS) |
| ANY | 100.64.1.2 | 10.1.1.1 (PSEUDO ADDRESS) |
| 100.64.1.1 | 10.0.0.1 (PSEUDO ADDRESS) | 100.64.2.1 |
| 100.64.1.2 | 10.0.1.1 (PSEUDO ADDRESS) | 100.64.2.2 |
| ... | ... | ... |

FIG. 8 SECOND EXEMPLARY EMBODIMENT

FIG. 10

USER MANAGEMENT TABLE 112

| USER ID | NW FUNCTION GROUP |
|---|---|
| 100.64.1.1 | GROUP (1) |
| 100.64.1.2 | GROUP (2) |
| ... | ... |

FIG. 16

GROUP MANAGEMENT TABLE 110-2

| NW FUNCTION GROUP | NF CONNECTION STRUCTURE | PSEUDO NW ADDRESS (DESTINATION B) | PSEUDO NW ADDRESS (DESTINATION A) |
|---|---|---|---|
| GROUP (1) | NF(a)–NF(b) | 10.0.0.0/24 | 10.1.0.0/24 |
| GROUP (2) | NF(c)–NF(d)–NF(b) | 10.0.1.0/24 | 10.1.1.0/24 |
| ⋮ | ⋮ | ⋮ | ⋮ |

FOURTH EXEMPLARY EMBODIMENT

FIG. 19

GROUP MANAGEMENT TABLE
110-2

| NW FUNCTION GROUP | NF CONNECTION STRUCTURE | PSEUDO NW ADDRESS (DESTINATION B) | PSEUDO NW ADDRESS (DESTINATION A) |
|---|---|---|---|
| GROUP (1) | NF(a)-NF(b) | 10.0.0.0/24 | 10.1.0.0/24 |
| GROUP (2) | NF(c)-NF(d)-NF(b) | 10.0.1.0/24 | 10.1.1.0/24 |
| ... | | | |

⇩ CHANGE 110-2

| NW FUNCTION GROUP | NF CONNECTION STRUCTURE | PSEUDO NW ADDRESS (DESTINATION B) | PSEUDO NW ADDRESS (DESTINATION A) |
|---|---|---|---|
| GROUP (1) | NF(a)-NF(d)-NF(b) | 10.0.0.0/24 | 10.1.0.0/24 |
| GROUP (2) | NF(c)-NF(d)-NF(b) | 10.0.1.0/24 | 10.1.1.0/24 |
| ... | | | |

FIG. 22

GROUP MANAGEMENT TABLE110-2

| NW FUNCTION GROUP | NF CONNECTION STRUCTURE | PSEUDO NW ADDRESS (DESTINATION B) | PSEUDO NW ADDRESS (DESTINATION A) |
|---|---|---|---|
| GROUP (1) | NF(a)-NF(b) | 10.0.0.0/24 | 10.1.0.0/24 |
| GROUP (2) | NF(c)-NF(d)-NF(b) | 10.0.1.0/24 | 10.1.1.0/24 |
| GROUP (3) | NF(e)-NF(b) | 10.2.0.0/24 | 10.2.1.0/24 |
| . . . | | | |

FIG. 23

PACKET PROCESSING TABLE 111

| ORIGINAL ADDRESS | | DESTINATION ADDRESS AFTER TRANSLATION |
|---|---|---|
| SOURCE ADDRESS | DESTINATION ADDRESS | |
| ... | ... | ... |
| 100.64.1.3 | 100.64.2.3 | 10.2.0.1 (PSEUDO ADDRESS) |
| ANY | 10.2.1.1 (PSEUDO ADDRESS) | 100.64.1.3 |
| | ... | |

FIG. 24

PACKET PROCESSING TABLE 111

| ORIGINAL ADDRESS | | DESTINATION ADDRESS AFTER TRANSLATION |
|---|---|---|
| SOURCE ADDRESS | DESTINATION ADDRESS | |
| ... | ... | ... |
| ANY | 100.64.1.3 | 10.2.1.1 (PSEUDO ADDRESS) |
| 100.64.1.3 | 10.2.0.1 (PSEUDO ADDRESS) | 100.64.2.3 |
| ... | | |

FIFTH EXEMPLARY EMBODIMENT

FIG. 33

PACKET PROCESSING TABLE 111-2

| ORIGINAL ADDRESS | | PSEUDO NW ADDRESS | LABEL |
|---|---|---|---|
| SOURCE ADDRESS | DESTINATION ADDRESS | | |
| 100.64.1.1 | 100.64.2.1 | 10.0.0.0/24 | A |
| 100.64.1.2 | 100.64.2.2 | 10.0.1.0/24 | a |
| ANY | 100.64.1.1 | 10.1.0.0/24 | DELETED |
| ANY | 100.64.1.2 | 10.1.1.0/24 | DELETED |
| ⋮ | | | |

FIG. 34

PACKET PROCESSING TABLE 111-3

| ORIGINAL ADDRESS | | PSEUDO NW ADDRESS | LABEL |
|---|---|---|---|
| SOURCE ADDRESS | DESTINATION ADDRESS | | |
| ANY | 100.64.1.1 | 10.1.0.0/24 | Z |
| ANY | 100.64.1.2 | 10.1.1.0/24 | z |
| 100.64.1.1 | 100.64.2.1 | 10.0.0.0/24 | DELETED |
| 100.64.1.2 | 100.64.2.2 | 10.0.1.0/24 | DELETED |
| . . . | | | |

FIG. 35

ROUTING TABLE 20-2

| NW ADDRESS | NEXT HOP | In Label | Out Label |
|---|---|---|---|
| NF(a) 2 | | | |
| 10.0.0.0/24 | NF(b) | A | B |
| 10.1.0.0/24 | COMMUNICATION APPARATUS 1-1 | Y | X |
| NF(b) 2 — 20-2 | | | |
| 10.0.0.0/24 | COMMUNICATION APPARATUS 1-2 | B | C |
| 10.1.0.0/24 | NF(a) | Z | Y |
| 10.0.1.0/24 | COMMUNICATION APPARATUS 1-2 | c | d |
| 10.1.1.0/24 | NF(d) | z | y |
| NF(c) 2 — 20-2 | | | |
| 10.0.1.0/24 | NF(d) | a | b |
| 10.1.1.0/24 | COMMUNICATION APPARATUS 1-1 | x | w |
| NF(d) 2 — 20-2 | | | |
| 10.0.1.0/24 | NF(b) | b | c |
| 10.1.1.0/24 | NF(c) | y | x |

SEVENTH EXEMPLARY EMBODIMENT

FIG. 37

PACKET PROCESSING TABLE 111-4

| ORIGINAL ADDRESS | | PSEUDO NW ADDRESS | LABEL | VIRTUAL NW LABEL |
|---|---|---|---|---|
| SOURCE ADDRESS | DESTINATION ADDRESS | | | |
| 100.64.1.1 | 100.64.2.1 | 10.0.0.0/24 | A | α |
| 100.64.1.2 | 100.64.2.2 | 10.0.1.0/24 | a | β |
| ANY | 100.64.1.1 | 10.1.0.0/24 | DELETED | DELETED |
| ANY | 100.64.1.2 | 10.1.1.0/24 | DELETED | DELETED |
| ... | | | | |

FIG. 38

PACKET PROCESSING TABLE 111-5

| ORIGINAL ADDRESS | | DESTINATION ADDRESS AFTER TRANSLATION | LABEL | VIRTUAL NW LABEL |
|---|---|---|---|---|
| SOURCE ADDRESS | DESTINATION ADDRESS | | | |
| ANY | 100.64.1.1 | 10.1.0.0/24 | Z | α |
| ANY | 100.64.1.2 | 10.1.1.0/24 | z | β |
| 100.64.1.1 | 100.64.2.1 | 10.0.0.0/24 | DELETED | DELETED |
| 100.64.1.2 | 100.64.2.2 | 10.0.1.0/24 | DELETED | DELETED |
| ... | | | | |

FIG. 39

ROUTING TABLE 20-3

| NW ADDRESS | NEXT HOP | In Label | Out Label | VIRTUAL NW LABEL |
|---|---|---|---|---|
| 10.0.0.0/24 | NF(b) | A | B | α |
| 10.1.0.0/24 | COMMUNICATION APPARATUS 1-1 | Y | X | α |

NF(a) — 20-3

| NW ADDRESS | NEXT HOP | In Label | Out Label | VIRTUAL NW LABEL |
|---|---|---|---|---|
| 10.0.0.0/24 | COMMUNICATION APPARATUS 1-2 | B | C | α |
| 10.1.0.0/24 | NF(a) | Z | Y | α |
| 10.0.1.0/24 | COMMUNICATION APPARATUS 1-2 | c | d | β |
| 10.1.1.0/24 | NF(d) | z | y | β |

NF(b) — 20-3

| NW ADDRESS | NEXT HOP | In Label | Out Label | VIRTUAL NW LABEL |
|---|---|---|---|---|
| 10.0.1.0/24 | NF(d) | a | b | β |
| 10.1.1.0/24 | COMMUNICATION APPARATUS 1-1 | x | w | β |

NF(c) — 20-3

| NW ADDRESS | NEXT HOP | In Label | Out Label | VIRTUAL NW LABEL |
|---|---|---|---|---|
| 10.0.1.0/24 | NF(b) | b | c | β |
| 10.1.1.0/24 | NF(c) | y | x | β |

NF(d)

COMMUNICATION SYSTEM, COMMUNICATION APPARATUS, CONTROL APPARATUS, NETWORK DEVICE, COMMUNICATION METHOD, CONTROL METHOD, AND PROGRAM

TECHNICAL FIELD

The present invention relates to network functions for performing communication services in a communication system.

BACKGROUND ART

In a communication system such as a mobile network, communication by users of the communication system passes through network functions (CPE (Customer Premises Equipment), BRAS (Broadband Remote Access Server), and the like) to obtain communication services performed by the network functions PTL 1 (FIG. 1 and others) discloses a mobile network architecture. In PTL 1, a terminal such as a PC (Personal Computer) accesses the Internet via CPE and BRAS. A communication from the terminal obtains communication services for accessing the Internet through the CPE and BRAS.

CITATION LIST

Patent Literature

[PTL 1]
Japanese Patent Application Unexamined Publication No. 2012-161089

SUMMARY OF THE INVENTION

Technical Problem

Communication systems as disclosed in PTL 1 have the problem that communication services that can be provided by a communication system depend on the architecture of the communication system. For example, in a communication system as disclosed in PTL 1, it is conceivable that communication services a terminal accessing the Internet can obtain are limited to the services that are performed by the CPE and BRAS. That is, in a communication system as disclosed in PTL 1, it is difficult to change network functions which users' communication passes through, thereby causing difficulty in providing variable communication services to users.

An object of the present invention is to provide a technique that is capable of making a change to communication services that can be provided by a communication system.

Solution to Problem

A communication system characterized by comprising: first means that is capable of executing a network function for providing a communication service; and second means that adds second identification information corresponding to first identification information that is assigned to a group of the network functions, to a packet belonging to the group, and sends the packet to the network function which performs packet forwarding within the group based on the second identification information.

A communication apparatus characterized by comprising: first means that adds second identification information corresponding to first identification information that is assigned to a group of network functions for providing communication services, to a packet belonging to the group; and second means that sends the packet with the second identification information added thereto to the network function, which can perform packet forwarding within the group based on the second identification information.

A control apparatus characterized by comprising: first means that indicates to a communication apparatus to add second identification information corresponding to first identification information that is assigned to a group of network functions for providing communication services, to a packet belonging to the group; and second means that indicates to at least one network function in the group to perform packet forwarding within the group based on the second identification information.

A network device characterized by comprising: first means that performs communication processing on a packet to which second identification information corresponding to first identification information that is assigned to a group of network functions for providing communication service is added, wherein the communication processing is performed by the network function; and second means that forwards the packet to another network function belonging to the group, based on the second identification information.

A communication method characterized by comprising: adding second identification information corresponding to first identification information that is assigned to a group of network functions for providing communication services, to a packet belonging to the group; and sending the packet with the second identification information added thereto to the network function which can perform packet forwarding within the group based on the second identification information.

A control method characterized by comprising: instructing a communication apparatus to add second identification information corresponding to first identification information that is assigned to a group of network functions for providing communication services, to a packet belonging to the group; and instructing at least one network function in the group to perform packet forwarding within the group based on the second identification information.

A communication method characterized by comprising: performing communication processing on a packet to which second identification information corresponding to first identification information that is assigned to a group of network functions for providing communication services is added, wherein the communication processing is performed by the network function; and forwarding the packet to another network function belonging to the group, based on the second identification information.

A program characterized by causing a computer to execute: processing for instructing a communication apparatus to add second identification information corresponding to first identification information that is assigned to a group of network functions for providing communication services, to a packet belonging to the group; and processing for instructing at least one network function in the group to perform packet forwarding within the group based on the second identification information.

A program characterized by causing a computer to execute: processing for performing communication processing on a packet to which second identification information corresponding to first identification information that is assigned to a group formed of network functions for providing communication services is added, wherein the communication processing is performed by the network function; and processing for forwarding the packet to another network function belonging to the group, based on the second identification information.

Advantageous Effects of Invention

According to the present invention, it is possible to provide a technique that enables communication services that can be provided by a communication system to be changed.

BRIEF DESCRIPTION OF DRAWINGS

FIG. 3 is a diagram showing an example of the structure of a group management table.

FIG. 4 is a diagram showing an example of the structure of a packet processing table in a communication apparatus.

FIG. 5 is a diagram showing an example of the structure of a packet processing table in the other communication apparatus.

FIG. 10 is a diagram showing an example of the structure of a user management table.

FIG. 16 is a diagram showing an example of the structure of a group management table.

FIG. 19 is a diagram showing an example of operations on a group management table in the fourth exemplary embodiment.

FIG. 22 is a diagram showing an example of the structure of the group management table.

FIG. 23 is a diagram showing an example of the structure of a packet processing table in a communication apparatus.

FIG. 24 is a diagram showing an example of the structure of a packet processing table in the other communication apparatus.

FIG. 33 is a diagram showing an example of the structure of a packet processing table in a communication apparatus.

FIG. 34 is a diagram showing an example of the structure of a packet processing table in the other communication apparatus.

FIG. 35 is a diagram showing an example of the structure of a routing table in a network function NF.

FIG. 37 is a diagram showing an example of the structure of a packet processing table in a communication apparatus.

FIG. 38 is a diagram showing an example of the structure of a packet processing table in the other communication apparatus.

FIG. 39 is a diagram showing an example of the structure of a routing table in a network function NF.

DESCRIPTION OF EMBODIMENTS

Hereinafter, exemplary embodiments of the present invention will be described. Each embodiment is shown for illustration, and the present invention is not limited to such exemplary embodiments.

First Exemplary Embodiment

A first exemplary embodiment of the present invention will be described.

Figure 1:
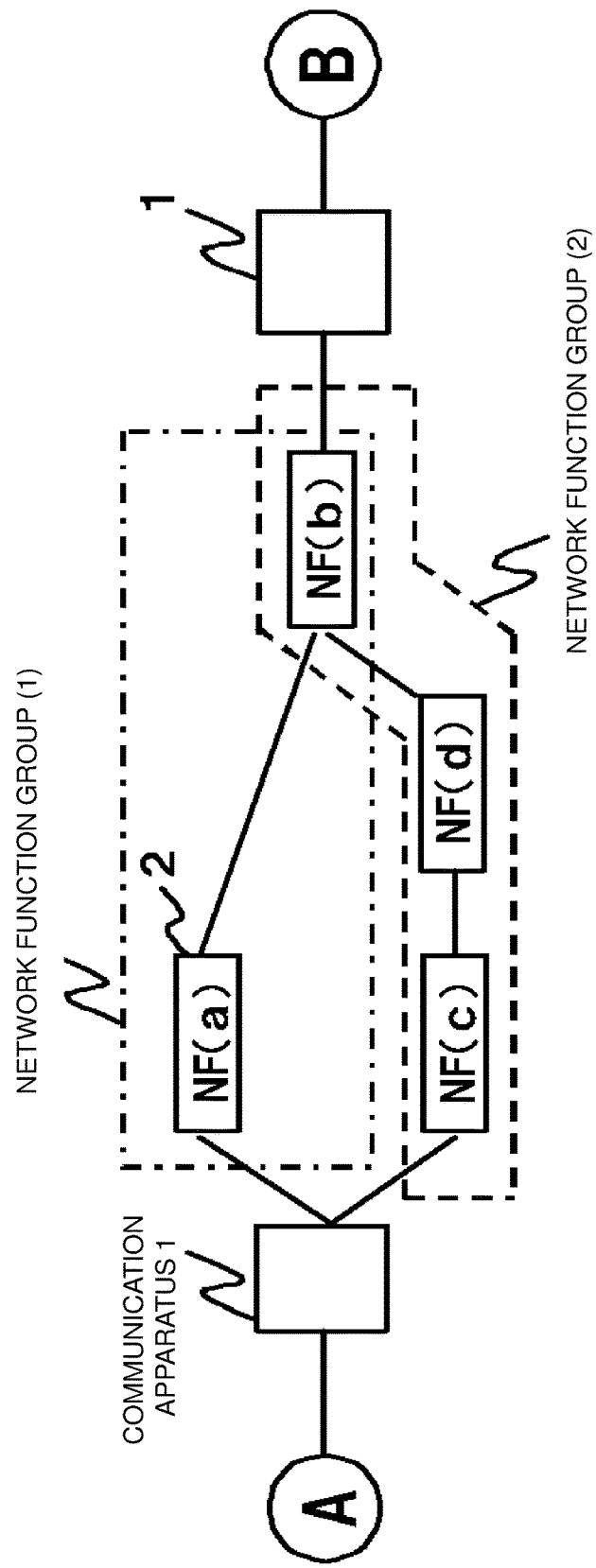
FIG. 1 is a diagram showing an example of the structure of a system according to a first exemplary embodiment of the present invention.

FIG. 1 shows an example of the structure of a communication system according to the first exemplary embodiment of the present invention.

The communication system of FIG. 1 includes network function groups, each formed of network functions (NFs) 2 for providing communication services. Each NF 2 provides a communication service according to the respective functionality it has. That is, communication services obtained by communication data may differ, depending on a network function group the communication data passes through. For example, in the example of FIG. 1, communication data passing through a network function group (1) and communication data passing through a network function group (2) obtain different communication services, depending on the NFs 2 belonging to each group.

The first exemplary embodiment provides a technique for interconnecting NFs 2 through which each communication passes (i.e., a network function group through which each communication passes) so as to make it possible to change communication services to be obtained by each communication, depending on a communication.

In the example of FIG. 1, each communication apparatus 1 has a function of changing network function groups for a communication between "A" and "B" in the figure to pass through. Each communication apparatus 1 adds identification information corresponding to a network function group to a packet and sends the packet with the identification information added thereto to a NF 2. Each NF 2 has a function of forwarding a packet, based on such identification information, to a NF 2 belonging to a network function group corresponding to the identification information. Accordingly, a packet sent by a communication apparatus 1 with identification information added thereto is forwarded so as to pass through NFs 2 corresponding to the identification information (i.e., a network function group corresponding to the identification information). With the above-described configuration, it is possible to interconnect the NFs 2 in a network function group through which a communication passes.

Note that "A" in the figure is, for example, an access network, which is a network that a user terminal connects to via a radio base station and equipment within the user's premises. Moreover, "B" in the figure is, for example, a core network, which is a communication circuit that the communication system uses for a communication backbone. For example, the core network is EPC (Evolved Packet Core) of LTE (Long Term Evolution), or the like. In the present description, an example in which "A" is an access network and "B" is a core network will be used in description hereinafter. However, the present invention is not limited to this example.

Each NF 2 is capable of executing the functionality of BRAS, CPE, IPS (Intrusion Prevention System), Firewall, or the like. For example, in the example of FIG. 1, NF (a) corresponds to BRAS, NF (b), Firewall, NF (c), CPE, and NF (d), IPS. However, functionalities that can be executed by the NFs 2 in the present invention are not limited to the above-mentioned functionalities.

Figure 2:
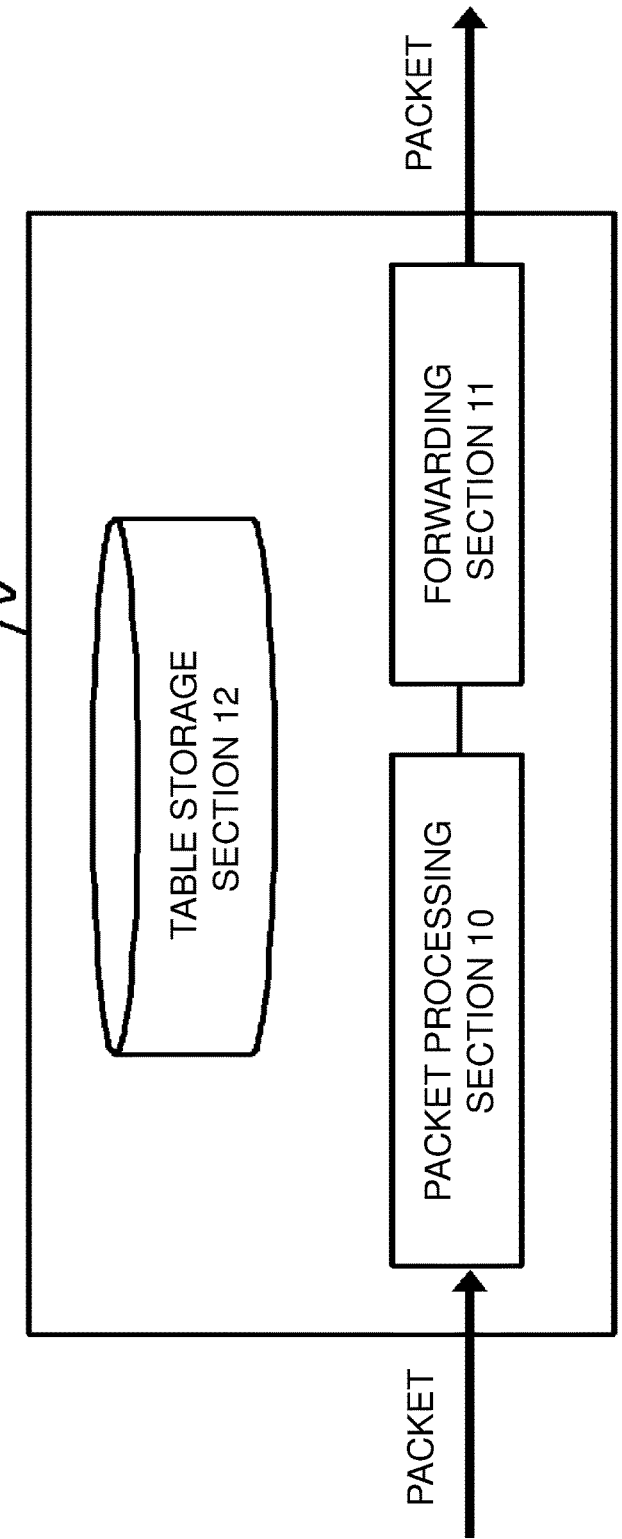
FIG. 2 is a diagram showing an example of the configuration of a communication apparatus in the first exemplary embodiment.

FIG. 2 shows an example of the configuration of the communication apparatus 1.

The communication apparatus 1 includes a packet processing section 10, a forwarding section 11, and a table storage section 12.

For example, the table storage section 12 stores information in formats as illustrated in FIG. 3 and FIG. 4 or 5. Note that the formats of information shown in FIGS. 3 to 5 are examples, and formats of information applicable to the present invention are not limited to those shown in FIGS. 3 to 5.

FIG. 3 shows an example of a group management table 110. The group management table 110 manages information related to network function groups in the communication system. Note that a network function group represents, for example, a group formed by a plurality of NFs 2 being concatenated. The group management table 110 stores pseudo network addresses assigned to the network function groups, respectively. In the example of FIG. 3, the group management table 110 stores, for each network function group, a pseudo network address for communication addressed to the access network ("A") and a pseudo network address for communication addressed to the core network ("B"). A pseudo network address is a spurious network address that is assigned to each group to concatenate the NFs 2 in the group. In the table 110, it is also possible that a plurality of pseudo network addresses are mapped to each group. For example, the table 110 may store a plurality of pseudo network addresses for communication addressed to the access network ("A"). The group management table 110 may store information for managing the NFs 2 (NFs (a) to (d) in the example of FIG. 3) that form each group, as in the example of FIG. 3. Pseudo network addresses are dynamically assigned to a group, for example, in response to the formation of a network function group.

FIG. 4 shows an example of a packet processing table 111 included in the communication apparatus 1 on the access network (A) side. For example, the packet processing table 111 is a correspondence table between the original addresses of a packet and the destination address thereof after address translation. Note that in the example of FIG. 4, a pseudo address corresponds to the above-described identification information corresponding to a network function group.

FIG. 5 shows an example of a packet processing table 111 included in the communication apparatus 1 on the core network (B) side. For example, the packet processing table 111 is a correspondence table between the original addresses of a packet and the destination address thereof after address translation. Note that in the example of FIG. 5, a pseudo address corresponds to the above-described identification information.

For example, the packet processing tables 111 are created by an operation manager of the communication system or the like, based on the group management table 110. For example, the operation manager determines a network function group corresponding to a user's communication, for each user of the communication system. In the examples of FIGS. 3 to 5, the operation manager assigns the network function group (1) to a user of ID "100.64.1.1". Moreover, the operation manager assigns the network function group (2) to a user of ID "100.64.1.2". Note that it is needless to say that a plurality of user IDs may be assigned to each group.

For example, the operation manager sets an indication in the packet processing table 111 of the communication apparatus 1 on the access network (A) side to translate the destination address of a packet that is sent from the user of ID "100.64.1.1" to a predetermined address ("100.64.2.1" in the example of FIGS. 4), to "10.0.0.1", a pseudo address corresponding to the network function group (1), as illustrated in FIG. 4. For example, the operation manager assigns a pseudo address, which is selected at random from those addresses belonging to a pseudo network address assigned to a group, to each user ID in such a manner that the pseudo addresses will not overlap among users.

For example, the operation manager sets an indication in the packet processing table 111 of the communication apparatus 1 on the core network (B) side to restore the destination address that has been translated at the communication apparatus 1 on the access network (A) side, to the original address, as illustrated in FIG. 5. For example, the operation manager sets an indication in the packet processing table 111 to restore the destination address of a packet that has been translated to "10.0.0.1", to original "100.64.2.1". For example, the operation manager assigns a pseudo address, which is selected at random from those addresses belonging to a pseudo network address assigned to a group, to each user ID in such a manner that the pseudo addresses will not overlap among users.

The operation manager sets indications similar to the foregoing in the packet processing tables 111, with respect to packets from the user of ID "100.64.1.2".

The operation manager sets an indication in the packet processing table 111 of the communication apparatus 1 on the access network (A) side to translate the destination address of a received packet that is a pseudo address (e.g., "10.1.0.1") to the ID ("100.64.1.1") of the user of the network function group (1) corresponding to the pseudo address ("10.1.0.1"), as illustrated in FIG. 4. Moreover, the operation manager sets an indication in the packet processing table 111 of the communication apparatus 1 on the access network (A) side to translate the destination address of a received packet that is a pseudo address (e.g., "10.1.1.1") to the ID ("100.64.1.2") of the user of the network function group (2) corresponding to the pseudo address ("10.1.1.1"), as illustrated in FIG. 4.

The operation manager sets an indication in the packet processing table 111 of the communication apparatus 1 on the core network (B) side to translate the destination address of a received packet that is a user ID (e.g., "100.64.1.1") to a pseudo address ("10.1.0.1") corresponding to the network function group (1), as illustrated in FIG. 5. Moreover, the operation manager sets an indication in the packet processing table 111 of the communication apparatus 1 on the core network (B) side to translate the destination address of a received packet that is a user ID (e.g., "100.64.1.2") to a pseudo address ("10.1.1.1") corresponding to the network function group (2), as illustrated in FIG. 5.

Note that the table storage section 12 of the communication apparatus 1 only needs to store the packet processing table 111 of FIG. 4 and does not necessarily need to store the group management table 110 of FIG. 3. In this case, for example, the group management table 110 is stored by an apparatus that is used when the operation manager configures the packet processing table 111 in the communication apparatus 1.

The packet processing section 10 adds identification information to a packet, based on the packet processing table 111 in the packet storage section 12. For example, the packet processing section 10, based on the original address of a received packet, retrieves a table entry corresponding to the original address from the packet processing table 111. The packet processing section 101 translates the destination address of the received packet to an address indicated by the retrieved entry.

The forwarding section 11 forwards a packet with identification information (e.g., a pseudo address) added thereto to a NF 2. For example, the forwarding section 11 forwards a packet to a NF 2 corresponding to identification information. In the example of FIG. 1, a packet whose destination address has been translated to pseudo address "10.0.0.1" is forwarded to the NF (a) that belongs to the network function group (1), corresponding to this pseudo address.

Each NF 2 executes network functionality it can provide. Each NF 2 may be implemented by using a dedicated apparatus, or may be implemented by using software operating on a virtual machine (VM). For example, if a NF 2 is a network function corresponding to Firewall, the NF 2 performs access control by filtering packets in accordance with predetermined policies.

Each NF 2 (NFs (a) to (d) in FIG. 1) has a function of routing a packet based on identification information (a pseudo address) that has been added to the packet by the communication apparatus 1.

Figure 6:
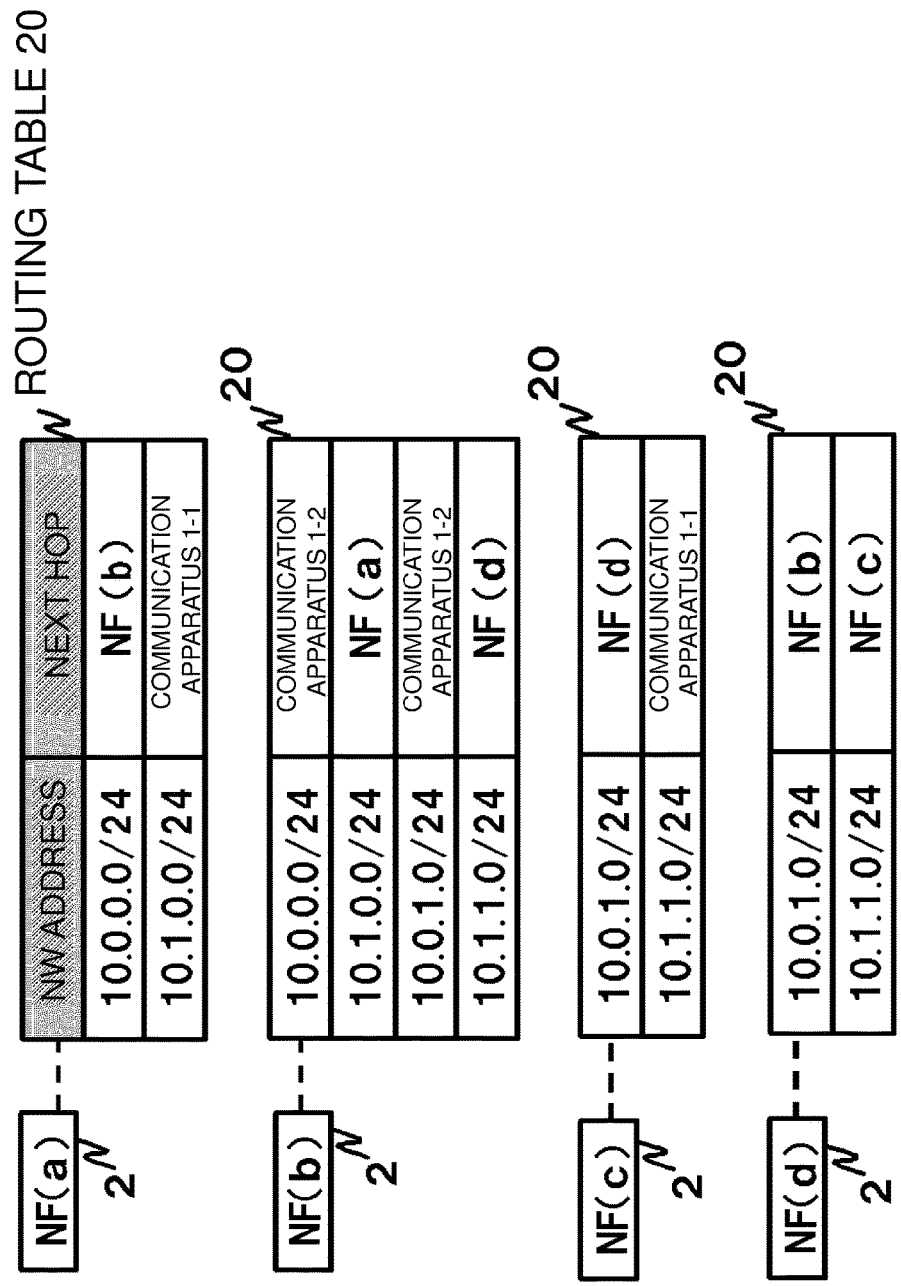
FIG. 6 is a diagram showing an example of the structure of a routing table in a network function NF.

FIG. 6 shows an example of respective routing tables 20 retained by the NFs 2. Each NF 2 performs routing of a packet based on the routing table 20. Note that the routing tables 20 illustrated in FIG. 6 are routing tables for forwarding packets corresponding respectively to the network function groups (1) and (2) shown in the example of FIG. 1. For example, the operation manager of the communication system performs creation, update, change, and the like of the routing tables 20.

The routing table 20 includes a network address corresponding to a pseudo address and information on a next hop (e.g., a network interface (port) number corresponding to a next hop) associated with the network address. In the example of FIG. 6, for example, information on next hop "NF (b)" indicates an address corresponding to the NF (b).

In the example of FIG. 6, "communication apparatus 1-1" indicates the communication apparatus 1 on the access network (A) side, and "communication apparatus 1-2" indicates the communication apparatus 1 on the core network (B) side.

For example, each NF 2 identifies a network address that a pseudo address added to a packet by the communication apparatus 1 belongs to, and forwards the packet to an address corresponding to a next hop identified.

Figure 7:
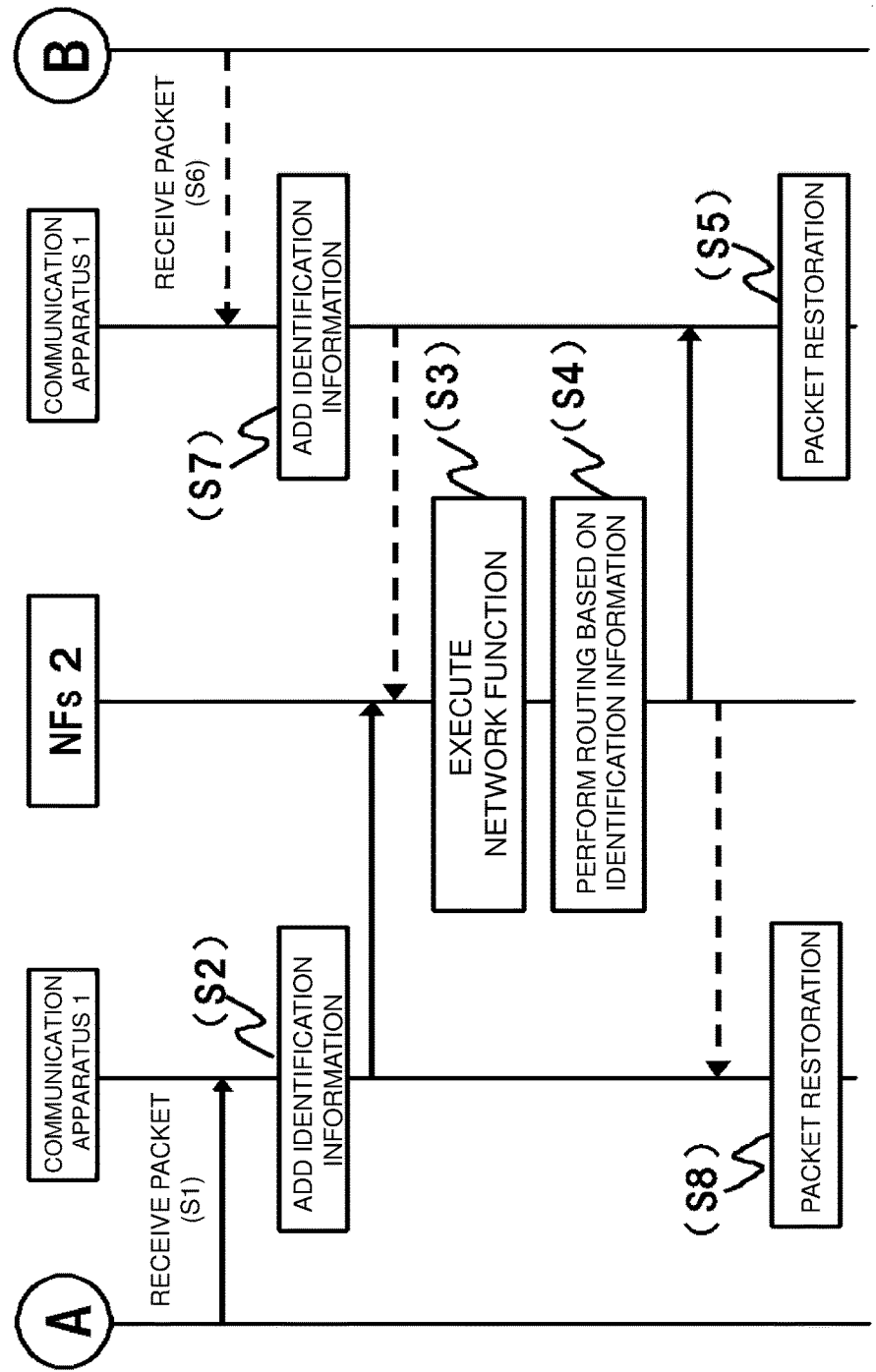
FIG. 7 is a sequence diagram showing an example of operations in the first exemplary embodiment.

FIG. 7 is a sequence diagram showing an example of operations in the first exemplary embodiment. "A" and "B" in FIG. 7 correspond to "A" (access network) and "B" (core network) in FIG. 1, respectively.

One of the communication apparatuses 1, when receiving a packet (Operation S1), adds identification information (e.g., a pseudo address) to the packet based on the packet processing table 111 (Operation S2). The communication apparatus 1 forwards the packet with the identification information added thereto to a NF 2.

Each NF 2 executes the network functionality it can execute (Operation S3).

Each NF 2 performs routing of the packet based on the identification information added to the packet (Operation S4).

When the other communication apparatus 1 receives the packet with the identification information added thereto, the communication apparatus 1 deletes the identification information from the packet and restores the packet (Operation S5). If the destination address of the packet has been translated to the identification information (e.g., a pseudo address), the communication apparatus 1 having received the packet, which has passed via NFs 2, restores the translated destination address to the original address and forwards the packet to the destination address.

Operations S1 to S5 show operations related to a communication sent from the access network (A) to the core network (B).

Operations related to a communication sent from the core network (B) to the access network (A) are shown at Operations S6 to S8. These operations are similar to Operations S1 to S5, and therefore a detailed description thereof will be omitted.

As described above, in the first exemplary embodiment, each communication apparatus 1 adds identification information corresponding to a network function group to a packet and sends the packet with the identification information added thereto to a NF 2. Each NF 2 has a function of forwarding the packet, based on the identification information, to a NF 2 belonging the network function group corresponding to the identification information. That is, a packet sent by each communication apparatus 1 with identification information added thereto is forwarded so that the packet will pass via the NFs 2 corresponding to the identification information (i.e., the network function group corresponding to the identification information). Accordingly, according to the first exemplary embodiment, it is possible to change communication services that can be provided by the communication system, depending on a communication.

Moreover, each NF 2 only needs to manage, with the routing table 20, a network address corresponding to a network function group the NF 2 belongs to. Accordingly, each NF 2 only needs to perform routing based on a network address and does not need to perform special processing or have a special device to solve the problems to be solved by the present invention.

Second Exemplary Embodiment

A second exemplary embodiment of the present invention will be described. In the second exemplary embodiment, it is possible to apply the technologies disclosed in the above-described first exemplary embodiment.

In the second exemplary embodiment, a controller 3 controls the operations of a plurality of communication apparatuses 1 in a centralized manner. Since the plurality of communication apparatuses 1 can be controlled in a centralized manner, the management efficiency in system operation of the operation manager of the communication system is enhanced.

Figure 8:
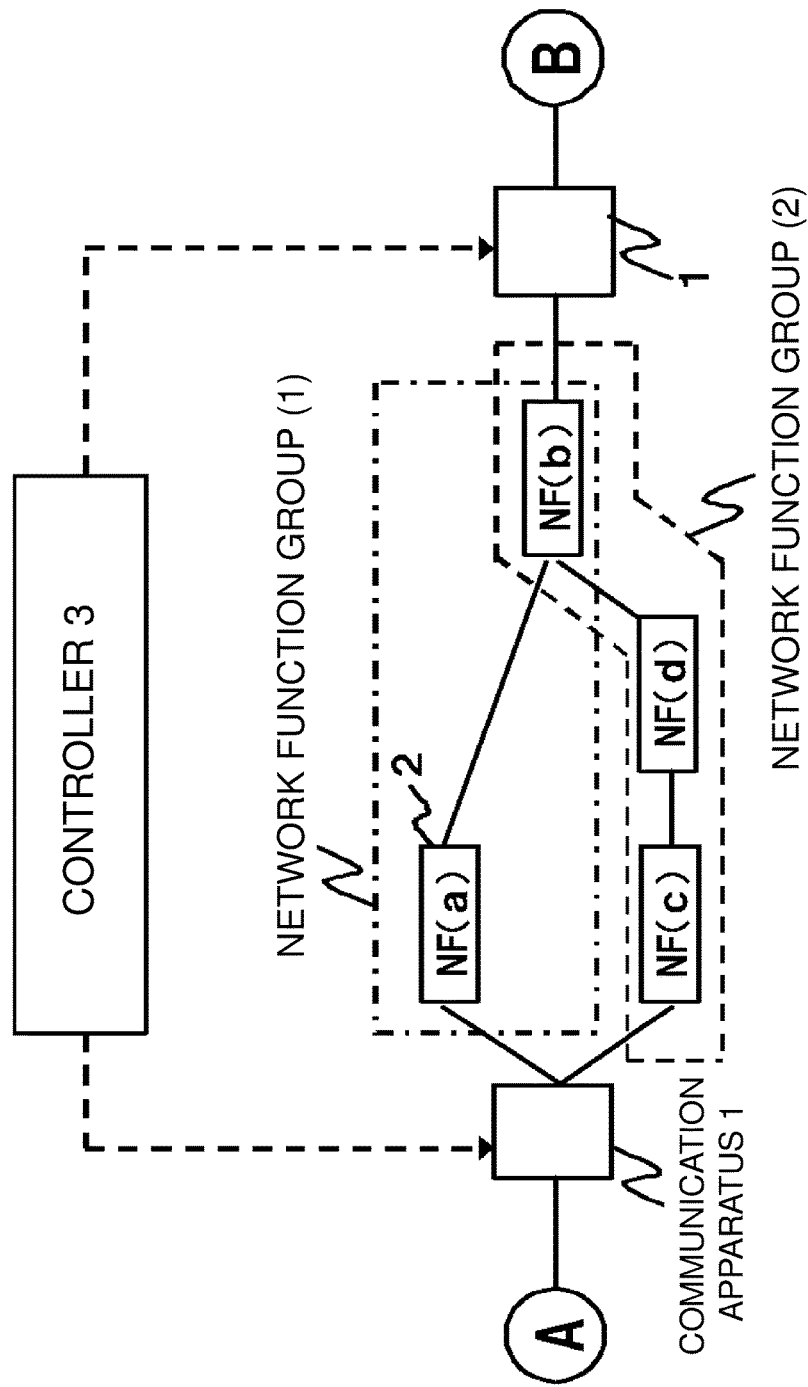
FIG. 8 is a diagram showing an example of the structure of a system according to a second exemplary embodiment of the present invention.

FIG. 8 shows an example of the structure of a communication system according to the second exemplary embodiment. A detailed description of the structure already described in the first exemplary embodiment will be omitted.

The controller 3 controls the operations of the communication apparatuses 1, for example, by using a predetermined control protocol (e.g., OpenFlow, I2RS (Interface to the Routing System), or ForCES (Forwarding and Control Element Separation)). For example, the controller 3 controls the operations of the communication apparatuses 1 by creating, updating, and changing the contents of a packet processing table 111 retained by each communication apparatus 1.

Figure 9:
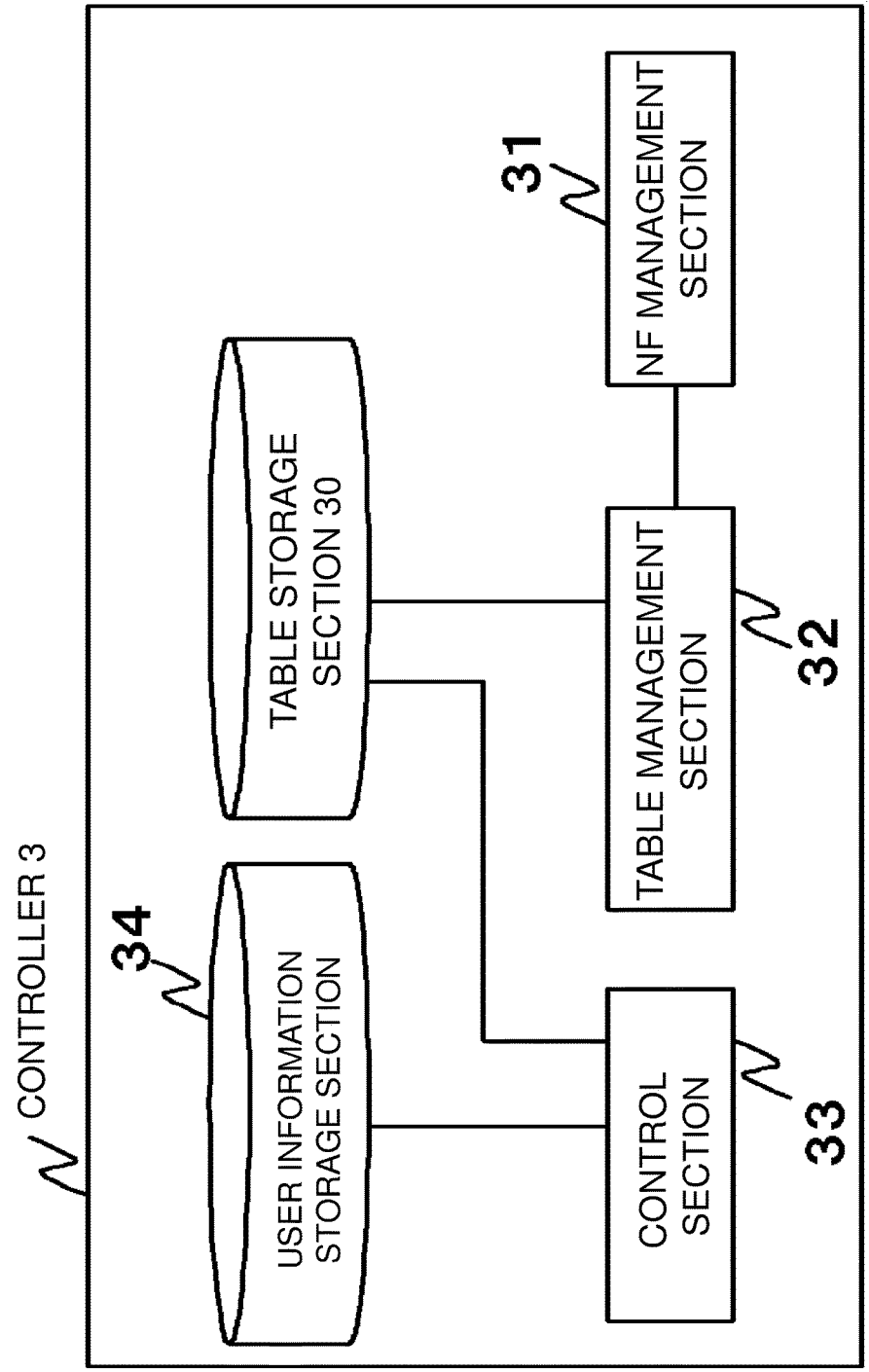
FIG. 9 is a diagram showing an example of the configuration of a controller.

FIG. 9 shows an example of the configuration of the controller 3.

The controller 3 includes a table storage section 30, a NF management section 31, a table management section 32, a control section 33, and a user information storage section 34.

For example, the table storage section 30 stores the group management table 110 illustrated in FIG. 3.

The user information storage section 34 stores a user management table 112 illustrated in FIG. 10. The user management table 112 stores the IDs of users of various communication services provided by the communication system, and network function groups corresponding to the individual users.

The NF management section 31 manages the NFs 2 present in the communication system. For example, the NF management section 31 manages network functionalities that can be executed by the individual NFs 2 (i.e., the types of NFs, such as CPE and BRAS), a connection structure of NFs 2 (i.e., a network topology composed of NFs 2) and the like.

The table management section 32 creates the group management table 110, for example, based on the information managed by the NF management section 31, and stores it in the table storage section 30. For example, the table management section 32 acquires from the NF management section 31 information related to the NFs 2 present in the communication system and respective network functionalities that can be executed by the NFs 2. The table management section 32 determines network function groups based on the acquired information. The table management section 32 may determine network function groups based on an instruction from the operation manager of the communication system. Moreover, the table management section 32 determines a pseudo network address to be assigned to each network function group. The table management section 32 may determine the pseudo network address based on an instruction from the operation manager of the communication system, or may automatically determine the pseudo network address independently of an instruction from the operation manager.

The control section 33 manages the packet processing tables 111 of the communication apparatuses based on the information stored in the user information storage section 34 and table storage section 30. For example, the control section 33 performs creation, update, change, and the like of the packet processing tables 111 of the communication apparatuses 1, based on the user management table 112 and group management table 110.

For example, the control section 33 determines the correspondence between each user ID and a network function group based on the user management table 112 and group management table 110. For example, the control section 33 associates user ID "100.64.1.1" with a group (1). For example, the control section 33 determines the correspondence between each user ID and a network function group based on a policy (e.g., SLA (Service Level Agreement) contracted by each user, or the like) set by the operation manager. For example, the control section 33 assigns a network function group to a user so that the quality of communication services provided by the group to be assigned to the user will comply with the user's SLA.

For example, the control section 33 sets an instruction in the packet processing table 111 of the communication apparatus 1 on the access network (A) side to translate the destination address of a packet whose source is user ID "100.64.1.1" to "10.0.0.1", a pseudo address corresponding to the group (1), as in the example of FIG. 4. Moreover, for example, the control section 33 sets an instruction in the communication apparatus 1 on the core network (B) side to restore the destination address that has been translated at the communication apparatus 1 on the access network (A) side. For example, the control section 33 sets an instruction in the packet processing table 111 of the communication apparatus 1 on the core network (B) side to restore the destination address of a packet that is pseudo address "10.0.0.1" to the original destination address, "100.64.2.1", as in the example of FIG. 5.

For example, the control section 33 may notify an original destination address that has been translated to a pseudo address by a communication apparatus 1 (e.g., the apparatus on the access network (A) side) to the other-end communication apparatus 1 (e.g., the apparatus on the core network (B) side). For example, the control section 33 acquires an original destination address before translation from a communication apparatus 1 that has translated the destination address to a pseudo address. The control section 33, based on the acquired original destination address, sets an instruction to restore a packet with the translated destination address in the other-end communication apparatus 1.

Moreover, in the communication system, a case is conceivable in which the type of a communication service (e.g., a video delivery service or the like) provided via the communication apparatus 1 on the access network (A) side and the communication apparatus 1 on the core network (B) side is predetermined. In this case, the operation manager and the controller 3 can gain previously knowledge of the destination a user will access (e.g., a video delivery server). Accordingly, in such a case, the control section 33 can set the packet processing tables 111 of the communication apparatuses 1 based on an address expected to be the destination the user will access. For example, in the example of FIG. 4, the control section 33 sets an entry for address translation in the packet processing table 111 of the communication apparatus 1 on the access network (A) side, based on an address expected to be a user's destination (e.g., "100.64.2.1", "100.64.2.2", or the like).

Moreover, in the communication system, a case is conceivable in which it is difficult to assume a user's destination beforehand when a communication service provided via the communication apparatus 1 on the access network (A) side and the communication apparatus 1 on the core network (B) side is Internet access or the like. In this case, for example, it is only necessary for the packet processing section 10 of each communication apparatus 1 to inquire of the controller 3 if any entry corresponding to the source and destination addresses of a received packet is not in the table 111.

For example, it is assumed that the communication apparatus 1 on the access network (A) side receives a packet with source address "100.64.1.1" and destination address "100.64.2.2", and that an entry for address translation of this packet is not in the table 111. In this case, the packet processing section 10 of the communication apparatus 1 requests an entry for dealing with this packet of the controller 3. The control section 33 of the controller 3 sets an entry for translating the destination address of a packet with source address "100.64.1.1" and destination address "100.64.2.1" to pseudo address "10.0.0.1", in the communication apparatus 1 on the access network (A) side. Moreover, the control section 33 sets an entry for restoring the translated destination address to the original address, "100.64.2.1", in the communication apparatus 1 on the core network (B) side. The communication apparatuses 1 each can process subsequent packets of the same type, based on the respective entries set through the above-described operations.

Figure 11:
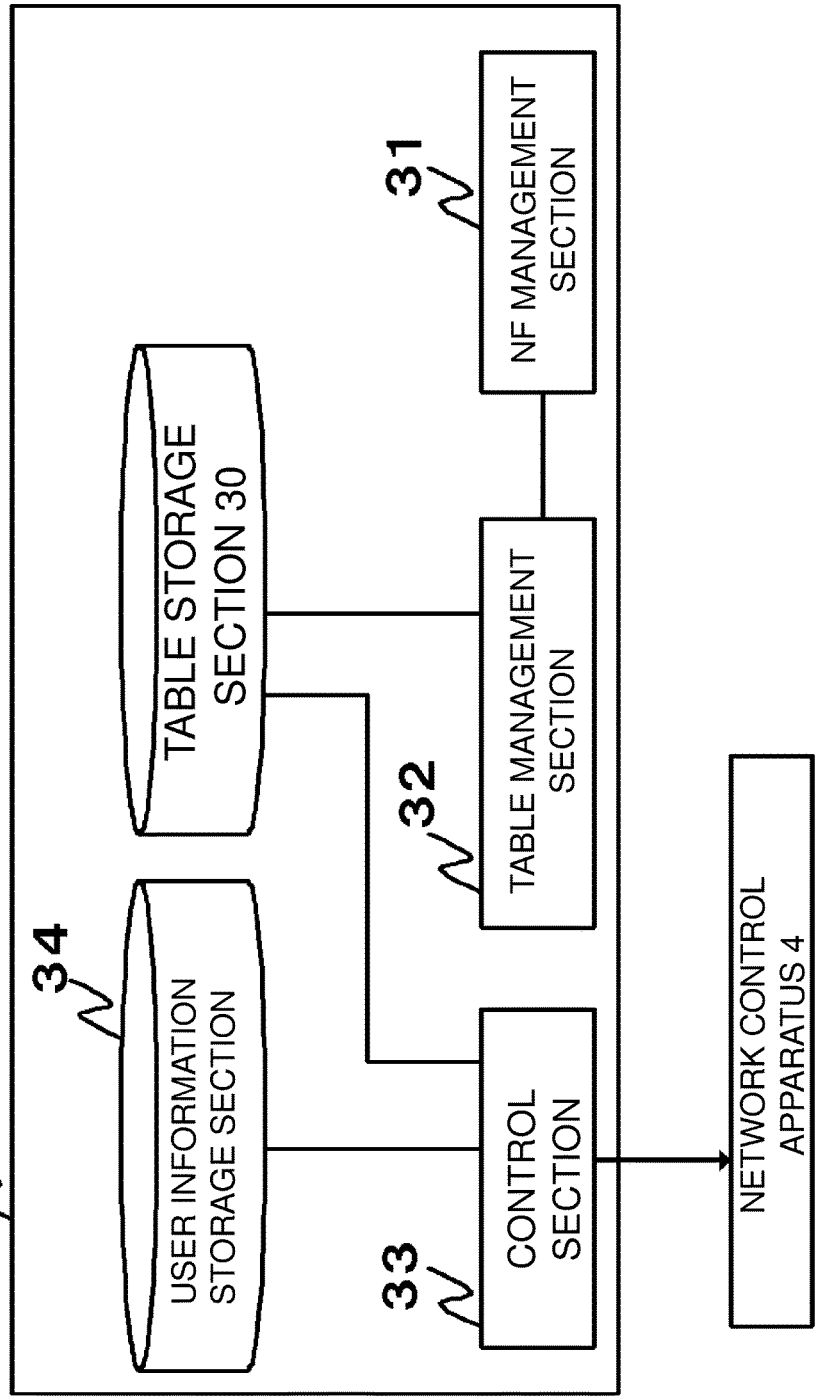
FIG. 11 is a diagram showing another example of the structure of the system according to the second exemplary embodiment.

The controller 3 may send instructions to the communication apparatuses 1 via a network control apparatus 4, not directly sending instructions to the control apparatuses 1. FIG. 11 shows an example in which the controller 3 sends instructions to the control apparatuses 1 via the network control apparatus 4. The control section 33 of the controller 3 instructs the network control apparatus 4 to control the communication apparatuses 1.

Figure 12:
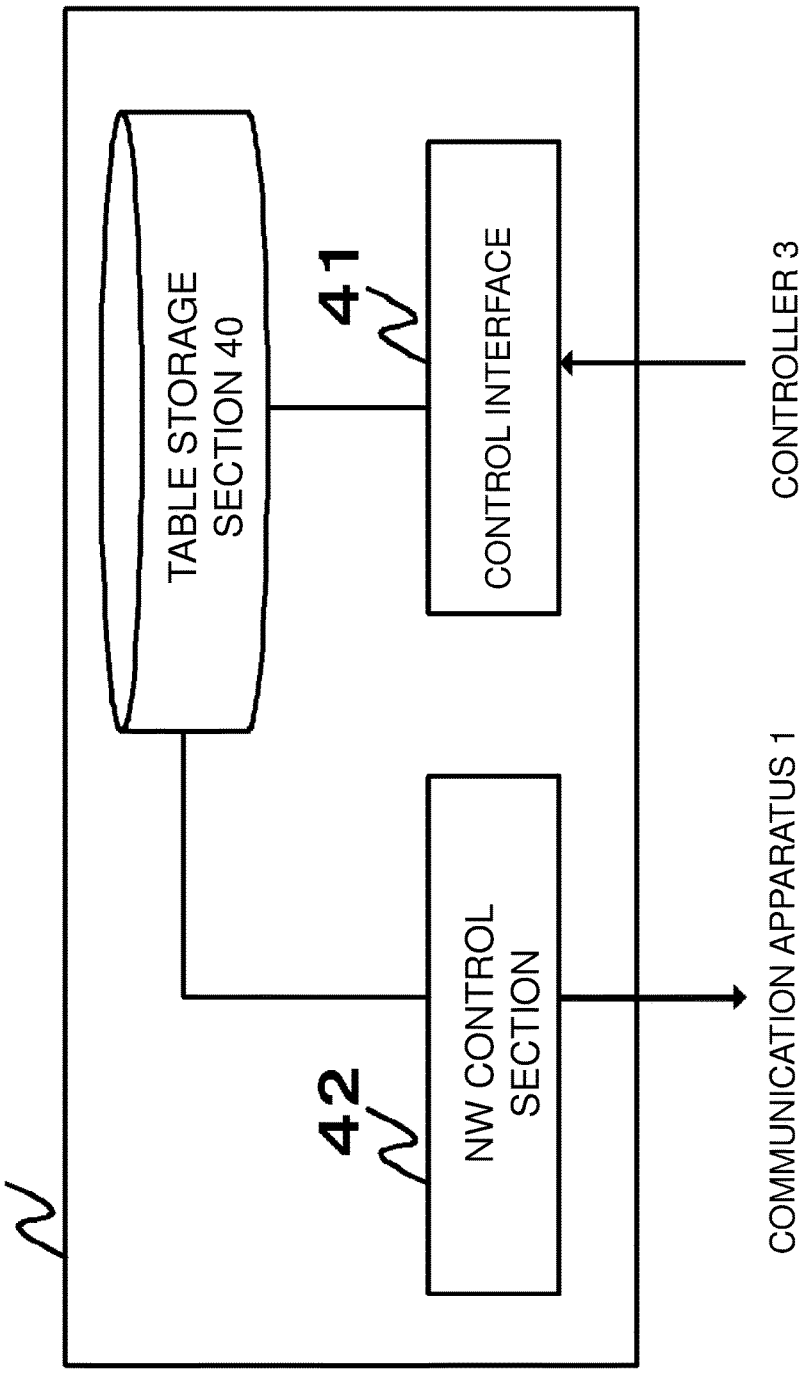
FIG. 12 is a diagram showing an example of the configuration of a network control apparatus shown in FIG. 11.

FIG. 12 shows an example of the configuration of the network control apparatus 4.

The network control apparatus 4 includes a table storage section 40, a control interface 41, and a NW control section 42.

The control interface 41 is an interface for communication with the controller 3. For example, the control interface 41 receives the group management table 110 from the control section 33 of the controller 3 and stores it in the table storage section 40. Moreover, the control interface 41 receives user information (e.g., user IDs and policies such as SLAB) managed by the controller 3.

The NW control section 42 performs creation, update, change, and the like of the packet processing tables 111 of the control apparatuses 1 through a method similar to that used by the control section 33 as described above, based on the information acquired from the controller 3 via the control interface 41.

Figure 13:
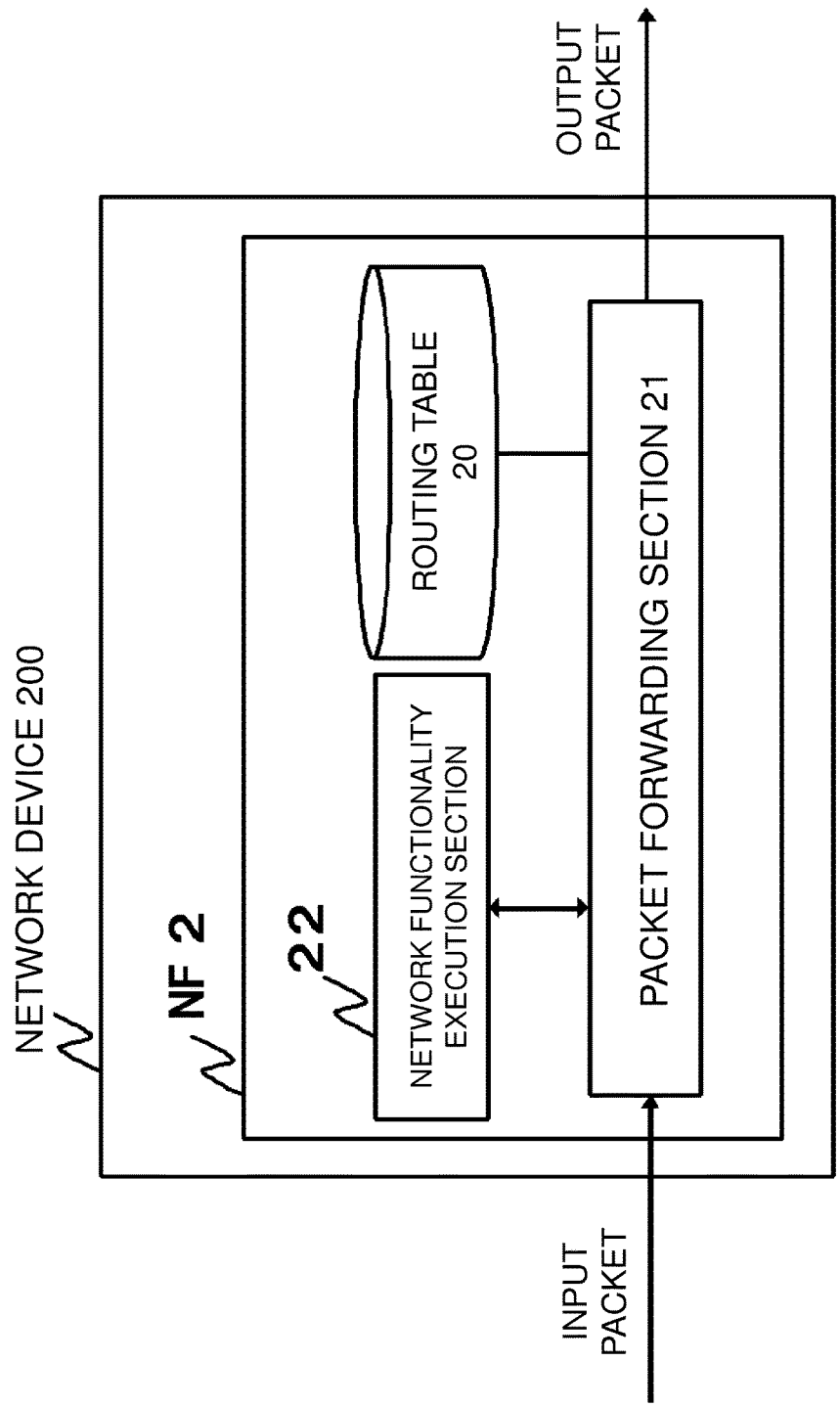
FIG. 13 is a diagram showing an example of the configuration of a network function NF.

FIG. 13 shows an example of the configuration of the network function (NF) 2.

The NF 2 includes a routing table 20, a packet forwarding section 21, and a network functionality execution section 22. Note that the NF 2 may be hardware equipment (e.g., a network device 200 such as a server or L2/L3 device) that executes predetermined network functionality, or may be software executed on a virtual machine activated on a network device 200. In case where the NF 2 is software, for example, the functionality of the NF 2 is executed by an application that operates on a virtual machine activated on a network device 200.

The packet forwarding section 21 transfers a received packet to the network functionality execution section 22.

The network functionality execution section 22 processes the transferred packet, based on the predetermined network functionality.

The packet forwarding section 21 forwards the packet processed by the network functionality execution section 22, based on the routing table 20. The routing table 20 is, for example, any table illustrated in FIG. 6.

Figure 14:
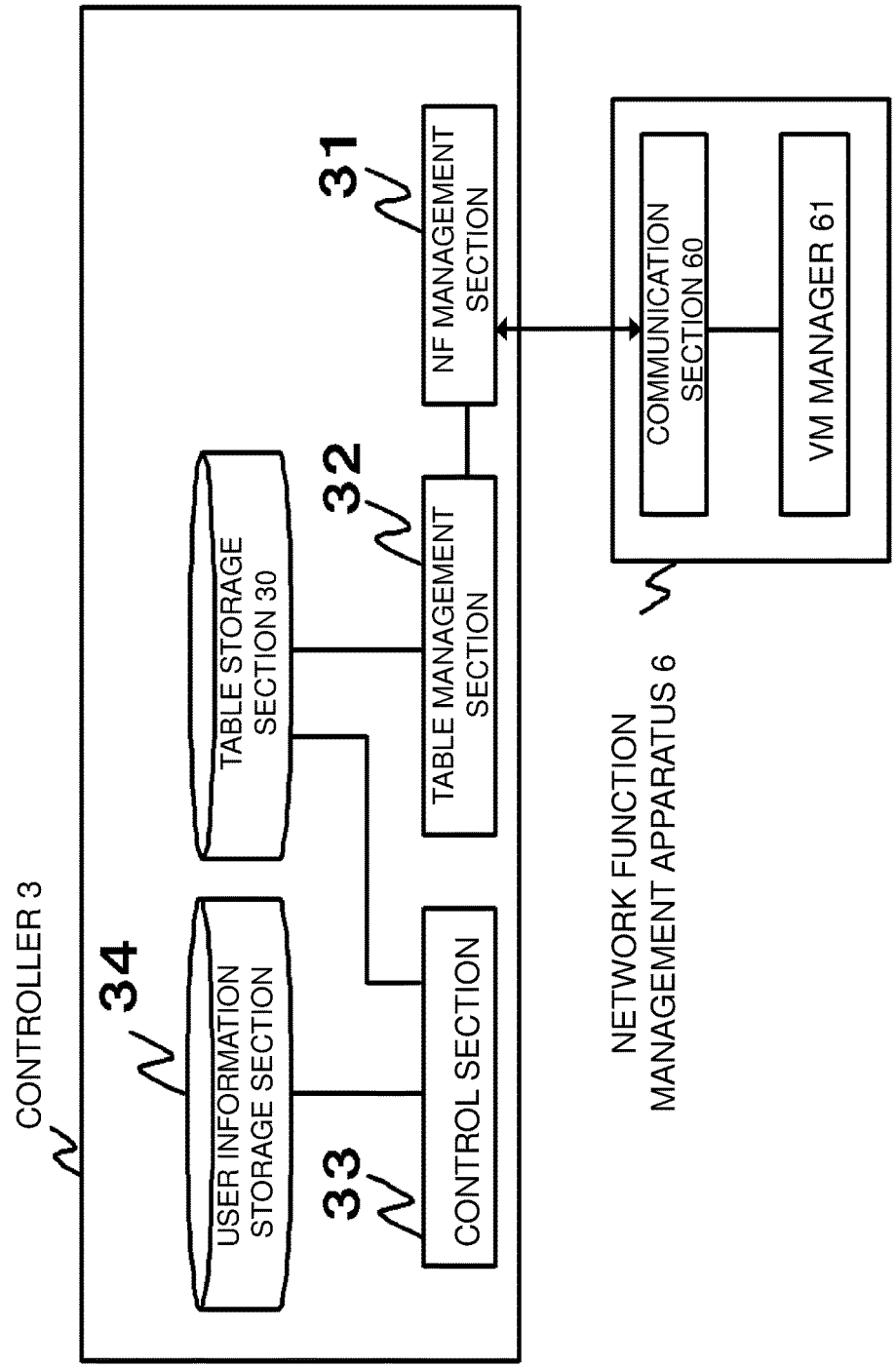
FIG. 14 is a diagram showing an example of the configuration of a network function management apparatus.

In case where the NF 2 is implemented by using software operating on a virtual machine (VM), for example, the NF 2 is managed by a network function management apparatus 6 (see FIG. 14).

Existing communication systems use a dedicated appliance, which is hardware equipment, for each network function in order to execute various network functionalities. Since such dedicated appliances are needed to construct a communication system, a network operator is forced to introduce a new dedicated appliance or appliances, for example, when it newly launches a network service. To introduce dedicated appliances, network operators pay a lot of costs such as purchase expenses, installation spaces, and the like for the dedicated appliances.

Moreover, in recent years, the life cycles of dedicated appliances are becoming shorter. Accordingly, network operators have the problem that the lifecycles of appliances come to an end without the network operators gaining sufficient profits from the introduced dedicated appliances.

A technology for constructing the network function of a dedicated appliance by using software can be a solution to the above-described problems. However, in case where a network function is constructed by using software, a technology for constructing a network function chain by dynamically linking network functions is more important. This is because a network function constructed by using software is dynamically activated by a virtual machine or the like, and it is therefore conceivable that an operation for adding a network function to a system is frequently performed, and each time, it is requested to dynamically link network functions and provide communication services.

FIG. 14 shows an example of the configuration of the network function management apparatus 6. The network function management apparatus 6 includes a communication section 60 and a VM (Virtual Machine) manager 61.

The communication section 60 is an interface for communication with the controller 3.

For example, the VM manager 61 performs activation and deactivation of a virtual machine-based NF 2. Moreover, for example, the VM manager 61 moves a virtual machine operating on a server to another server (migration). For example, the operation manager of the communication system performs activation, deactivation, migration, and the like of a NF 2 through the VM manager 61.

For example, the VM manager 61 notifies the controller 3 of information concerning the NFs 2 present in the communication system and respective network functionalities that can be executed by the NFs 2.

As described above, according to the second exemplary embodiment, the controller 3 controls the operations of the plurality of communication apparatuses 1 in a centralized manner. Since the plurality of communication apparatuses 1 can be controlled in a centralized manner, the management efficiency in system operation of the operation manager of the communication system is enhanced.

Third Exemplary Embodiment

A third exemplary embodiment of the present invention will be described. In the third exemplary embodiment, it is possible to apply at least one of the above-described first and second exemplary embodiments.

In the third exemplary embodiment, the controller 3 controls the routing table 20 of each NF 2. Since the controller 3 can manage the routing table 20 of each NF 2 in a centralized manner, the efficiency in operation of the communication system is enhanced.

Figure 15:
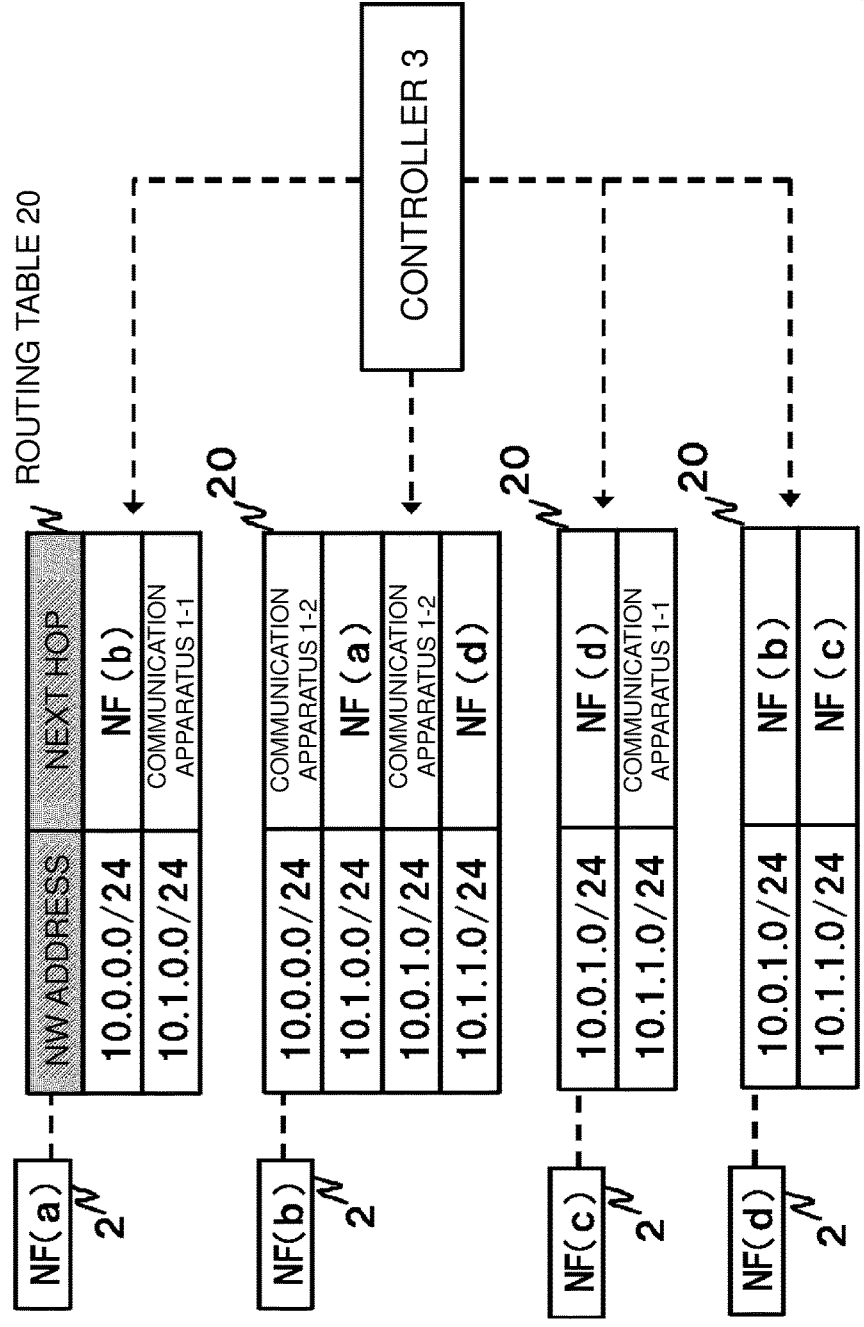
FIG. 15 is a diagram showing an example of operations in a system according to a third exemplary embodiment of the present invention.

FIG. 15 shows an example of the third exemplary embodiment. The controller 3 controls the routing table 20 of each NF 2 in the communication system illustrated in FIG. 1. For example, the controller 3 performs creation, change, update, deletion, and the like of the routing tables 20. For example, the control section 33 of the controller 3 performs creation, change, update, deletion, and the like of the routing tables 20. Note that an example of the configuration of the controller 3 is similar to that of the above-described second exemplary embodiment, and therefore a detailed description thereof will be omitted.

For example, the controller 3 controls the routing tables 20 based on a group management table 110-2 illustrated in FIG. 16. The group management table 110-2 includes information indicating connection structures of NFs 2. The controller 3 refers to the table 110-2 and thereby recognizes the connection structures of the NFs 2 in each network function group. The controller 3 controls the routing tables 20, based on the recognized connection structures. For example, the controller 3 recognizes from the table 110-2 that a chain of NFs 2 in the order NF (c)-NF (d)-NF (b) is formed in a group (2) in FIG. 16. Accordingly, for a communication from the access network (A) to the core network (B), the controller 3 recognizes that a next hop following NF (c) is NF (d) and a next hop following NF (d) is NF (b), and thus can control the routing table 20 of each NF 2.

Figure 17:
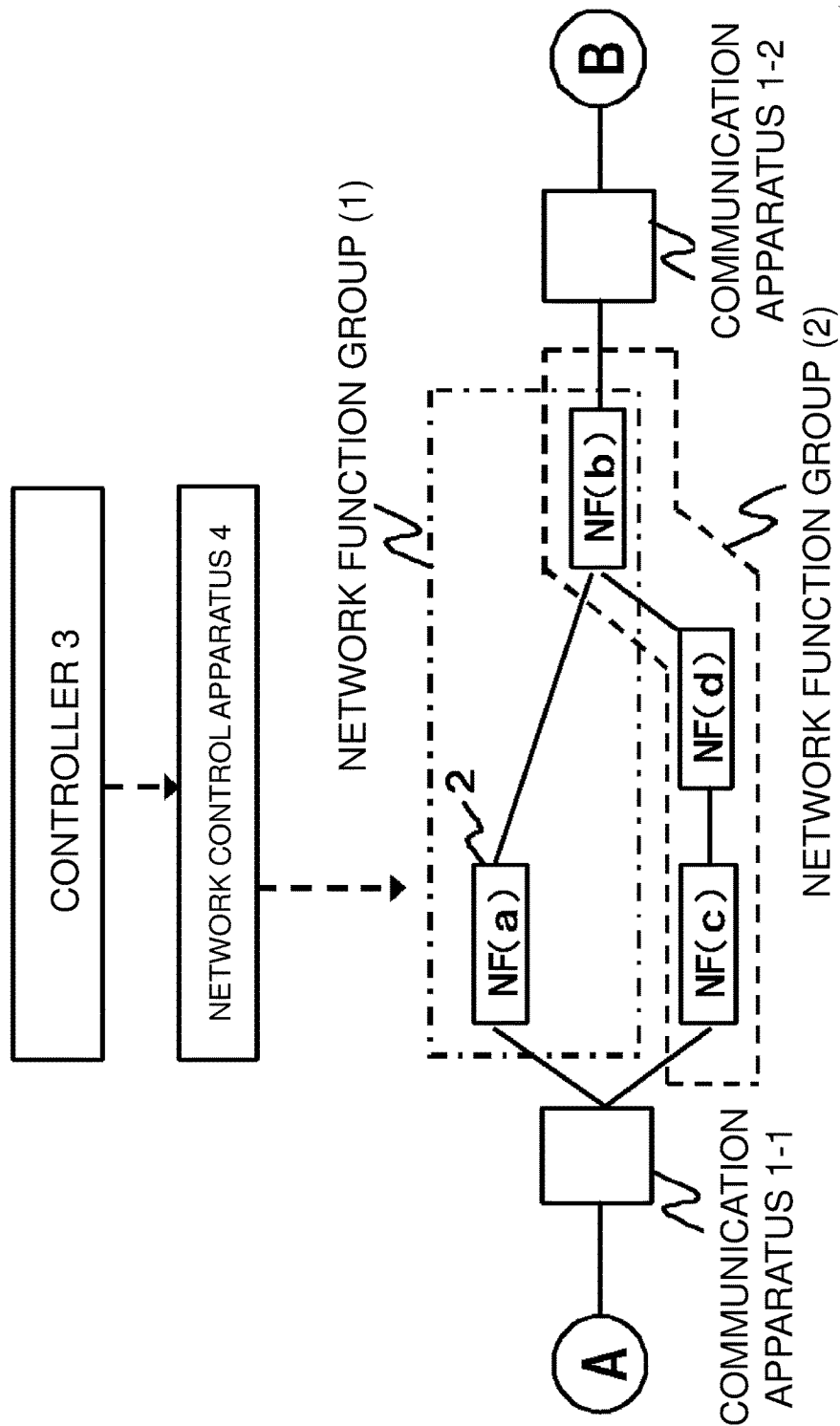
FIG. 17 is a diagram showing an example of the structure of the system according to the third exemplary embodiment

The controller 3 may control the routing table 20 of each NF 2 via the network control apparatus 4, as in an example of FIG. 17. An example of the configuration of the network control apparatus 4 is similar to that of the second exemplary embodiment, and therefore a description thereof will be omitted.

Fourth Exemplary Embodiment

A fourth exemplary embodiment of the present invention will be described. In the fourth exemplary embodiment, it is possible to apply at least one of the above-described first to third exemplary embodiments.

In the fourth exemplary embodiment, the controller 3 controls the packet processing tables 111 of the communication apparatuses 1 and the routing tables 20 of the NFs 2, depending on a change in a network function group, the addition of a network function group, or the like. According to the fourth exemplary embodiment, the efficiency in operation of the communication system is further enhanced.

Figure 18:
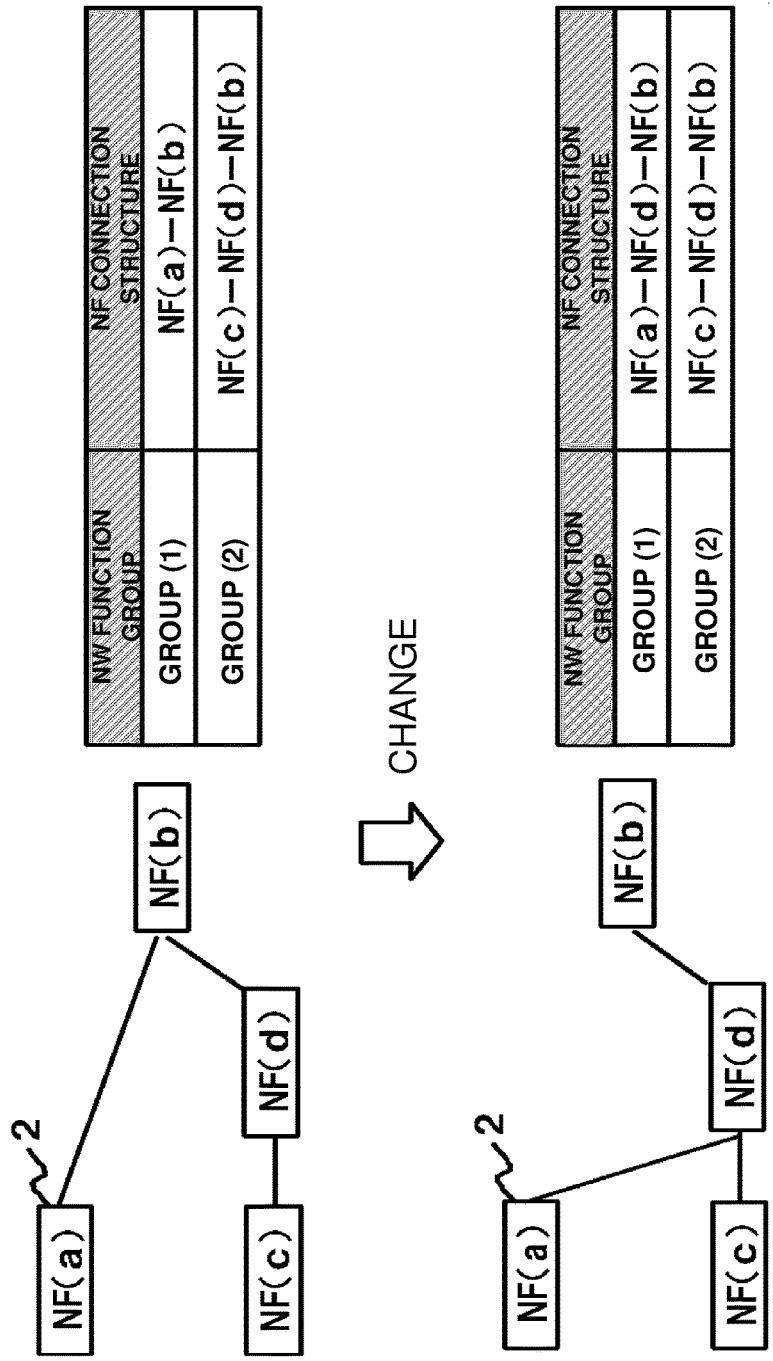
FIG. 18 is a diagram showing an example of operations in a system according to a fourth exemplary embodiment of the present invention.

FIG. 18 shows an example of operations in the fourth exemplary embodiment. In the example of FIG. 18, the configuration of the network function group (1) in the communication system illustrated in FIG. 1 is changed. The connection structure of the NFs 2 in the network function group (1) is changed from "NF (a)-NF (b)" to "NF (a)-NF (d)-NF (b)".

FIG. 19 shows an example in which the group management table 110-2 is changed with a change in the connection structure of the NFs 2 in a network function group. Note that in the example of FIG. 19, the connection structure of the NFs 2 in the network function group (1) is changed, but pseudo network addresses corresponding to the group (1) are not changed. As in the example of FIG. 19, even if the connection structure of the NFs 2 in each network function group is changed, pseudo network addresses corresponding to each group are not changed, whereby it is possible to suppress the number of entries to be changed in the routing tables 20.

Figure 20:
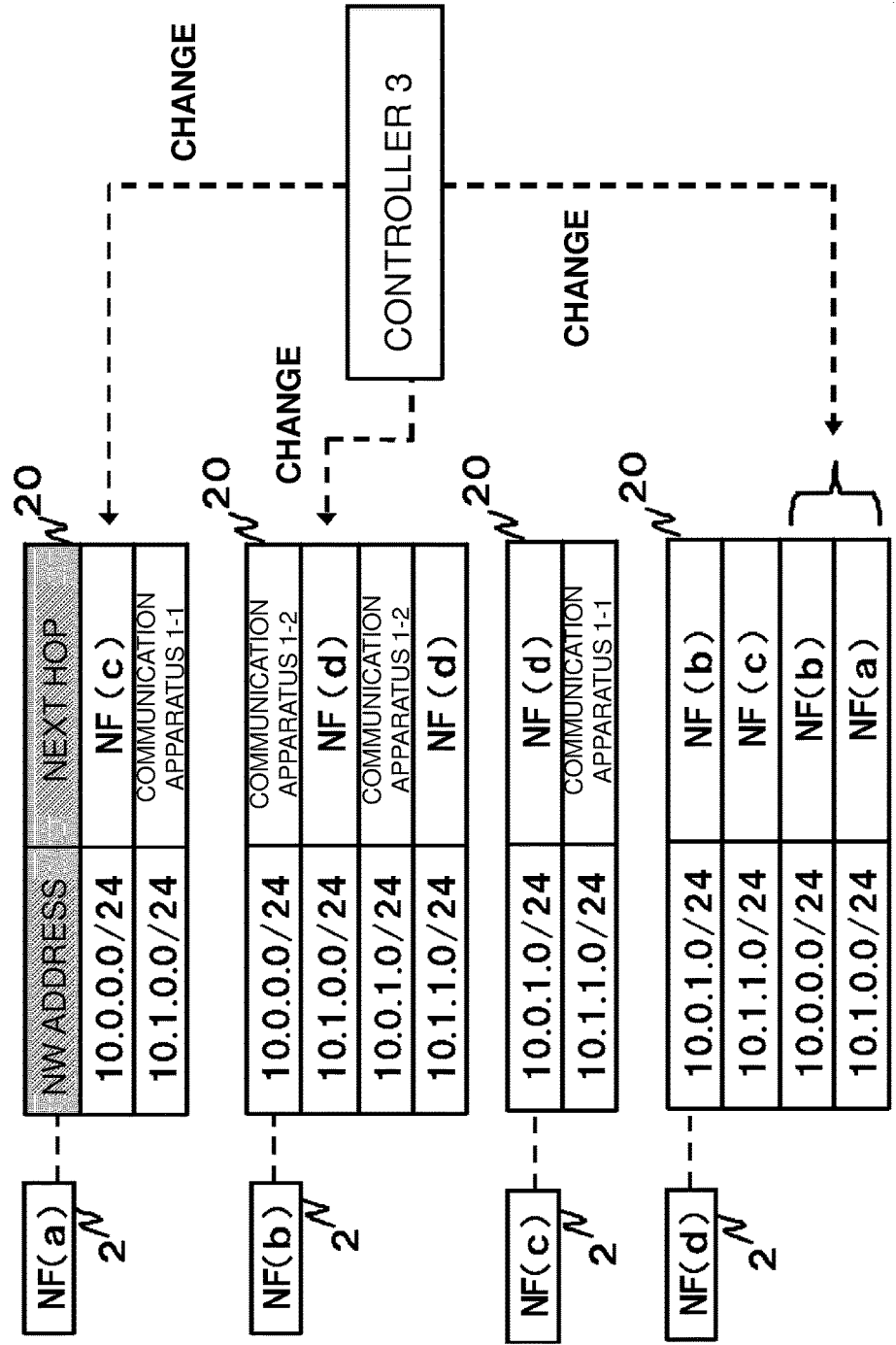
FIG. 20 is a diagram showing an example of operations in the system according to the fourth exemplary embodiment.

FIG. 20 shows an example of operations for changing routing tables 20 with a change in connection structure of NFs 2 illustrated in FIGS. 18 and 19. For example, the controller 3 changes entries in routing tables 20 in accordance with a change in the group management table 110-2. For example, the controller 3 only changes those entries relevant to a change in a network function group. In the example of FIG. 20, the first entry at NF (a) and the second entry at NF (b) are changed, and the third and fourth entries at NF (d) are changed.

Figure 21:
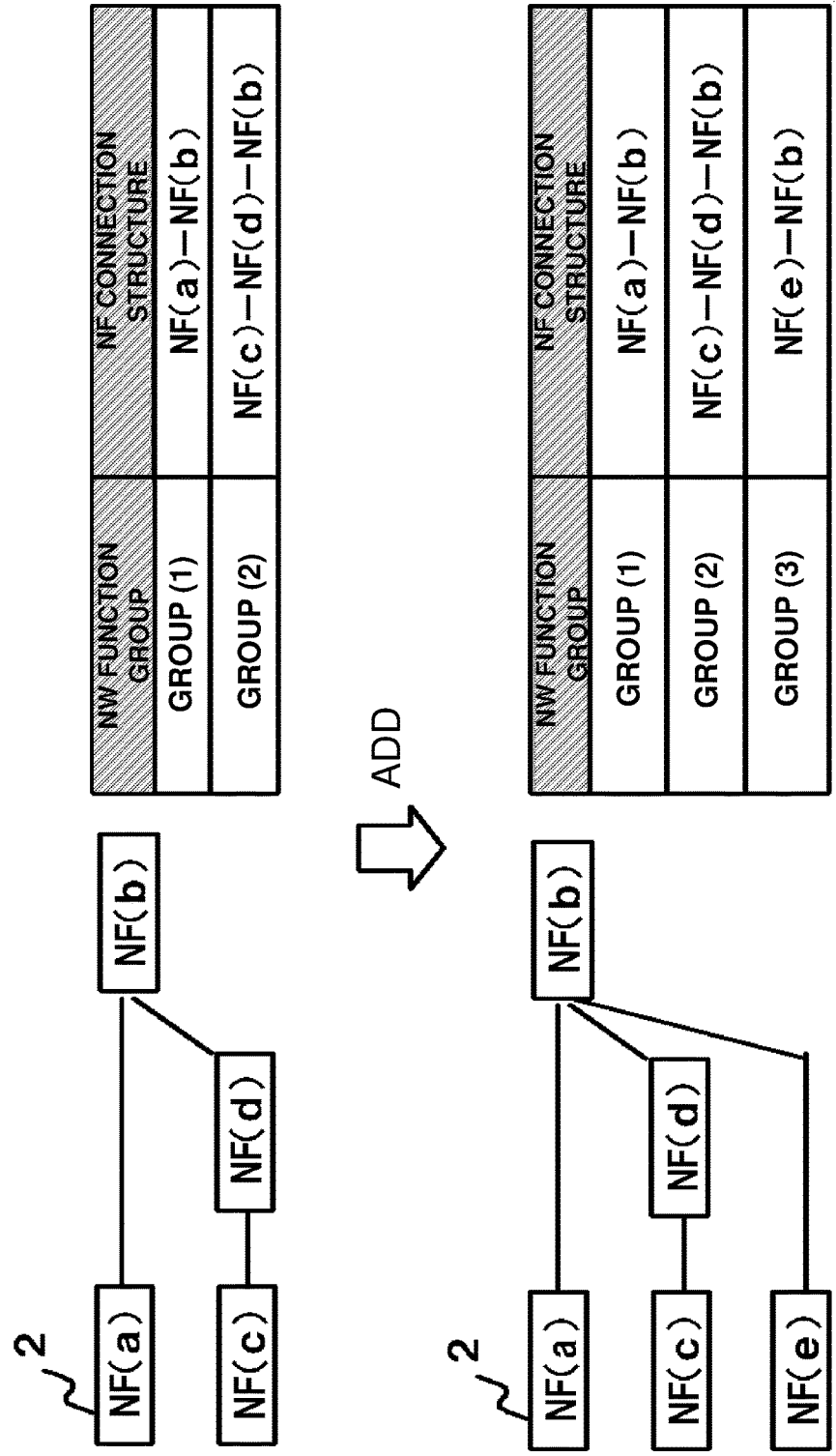
FIG. 21 is a diagram showing an example of operations in the system according to the fourth exemplary embodiment.

FIG. 21 shows an example of a case in which a new network function group is added. In the example of FIG. 21, a network function group (3) formed of NF (e) and NF (b) is added.

FIG. 22 shows an example of the group management table 110-2 to which an entry related to the group (3) is added. In the added entry related to the group (3), new pseudo network addresses are added. For example, the table management section 32 of the controller 3 determines pseudo network addresses to assign to the added group and sets them in the table 110-2. The controller 3 automatically assigns pseudo network addresses to an added group, whereby the management cost to the operation manager of the communication system is reduced.

The controller 3 updates the packet processing tables 111 of the communication apparatuses 1 in response to an update in the table 110-2. FIGS. 23 and 24 show examples of the tables 111 updated by the controller 3.

For example, the controller 3 determines a user who will belong to the added group (3), for example, in response to an instruction from the operation manager. In the examples of FIGS. 23 and 24, the controller 3 assigns a user of user ID "100.64.1.3" to the group (3).

FIG. 23 shows an example of the packet processing table 111 of the communication apparatus 1 on the access network (A) side. The controller 3 sets in the table 111 an entry for translating the destination address of a packet whose source is "100.64.1.3" to a pseudo address ("10.2.0.1" in the example of FIG. 23) corresponding to the pseudo network address of the group (3). Note that the controller 3 may automatically determine a pseudo address to be corresponding to the user ID from among those pseudo addresses within the range of the pseudo network address and set it in the table 111. For example, the controller 3 determines a pseudo address at random from among those addresses within the range of the pseudo network address. The controller 3 automatically determines a pseudo address, whereby the management cost to the operation manager of the communication system is reduced. Moreover, the controller 3 sets in the table 111 an entry for translating the destination address of a packet addressed to "10.2.1.1", a pseudo address of the group (3), (a packet from the core network (B) to the access network (A)) to the user ID corresponding to the group (3) ("100.64.1.3" in the example of FIG. 23).

FIG. 24 shows an example of the packet processing table 111 of the communication apparatus 1 on the core network (B) side. The controller 3 sets in the table 111 an entry for translating the destination address of a packet addressed to "100.64.1.3" to a pseudo address ("10.2.1.1" in the example of FIG. 24) corresponding to the pseudo network address of the group (3). Note that the controller 3 may automatically determine a pseudo address to be corresponding to the user ID from among those pseudo addresses within the range of the pseudo network address and set it in the table 111. For example, the controller 3 determines a pseudo address at random from among those addresses within the range of the pseudo network address. The controller 3 automatically determines a pseudo address, whereby the management cost to the operation manager of the communication system is reduced. Moreover, the controller 3 sets in the table 111 an entry for restoring the destination address of a packet addressed to "10.2.0.1", a pseudo address of the group (3), (a packet from the access network (A) to the core network (B)) to the destination address before translation ("100.64.2.3" in the example of FIG. 24).

Figure 25:
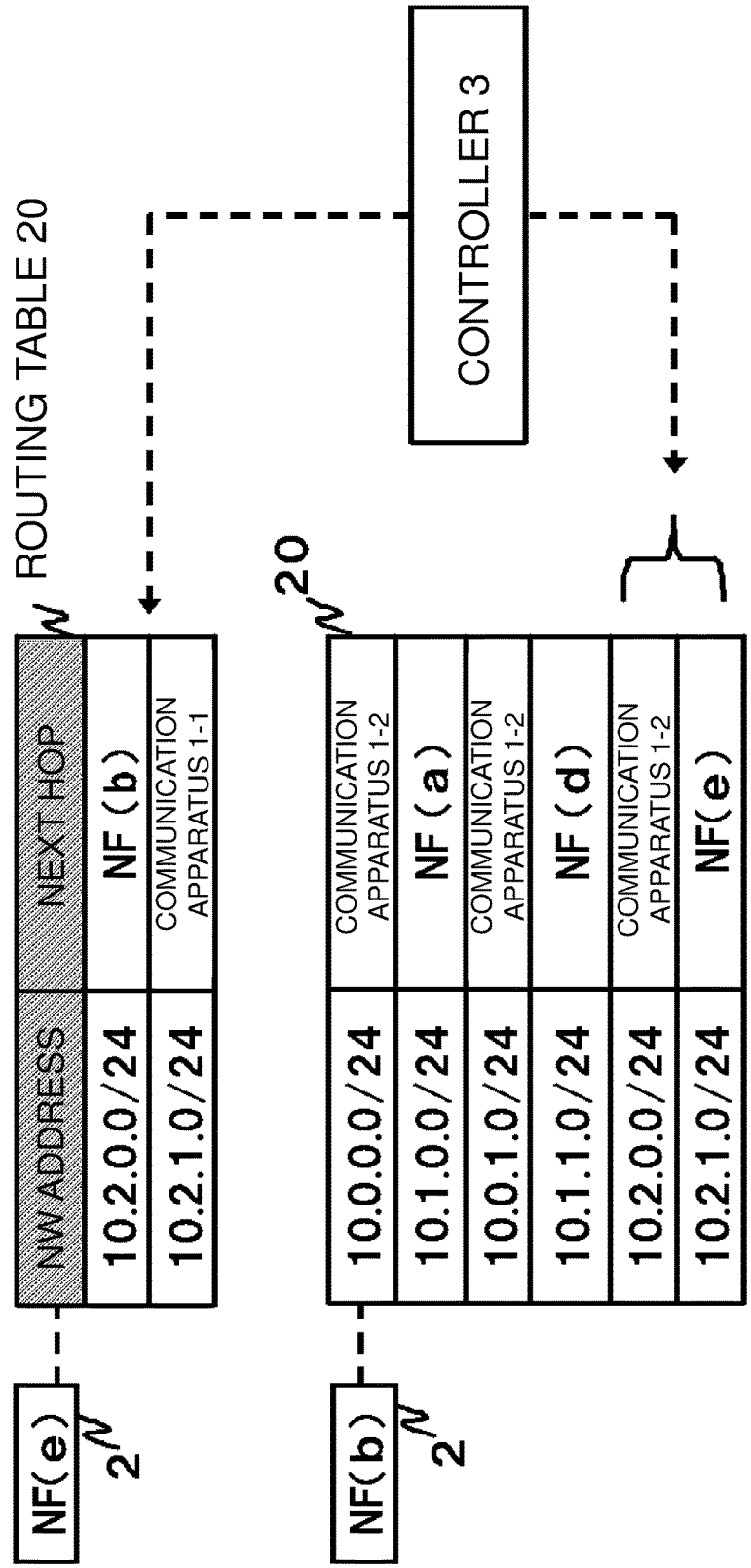
FIG. 25 is a diagram showing an example of operations in the system according to the fourth exemplary embodiment.

FIG. 25 shows an example in which the controller 3 controls the routing tables 20 of NFs 2 in response to the addition of a network function group.

In the example of FIG. 25, the controller 3 creates a routing table 20 for the NF (e), which is a network function newly added to the communication system. Moreover, the controller 3 adds new entries corresponding to the added network function group (3) to the routing table 20 of the NF (b).

Fifth Exemplary Embodiment

A fifth exemplary embodiment of the present invention will be described. In the fifth exemplary embodiment, it is possible to apply at least one of the above-described first to fourth exemplary embodiments.

In the fifth exemplary embodiment, a management apparatus 5 is provided for the operation manager of the communication system to manage the NFs 2 and network function groups. The operation manager can manage the NFs 2 and network function groups, for example, by using a GUI (Graphical User Interface) of the management apparatus 5, and the efficiency in system operation is enhanced.

Figure 26:
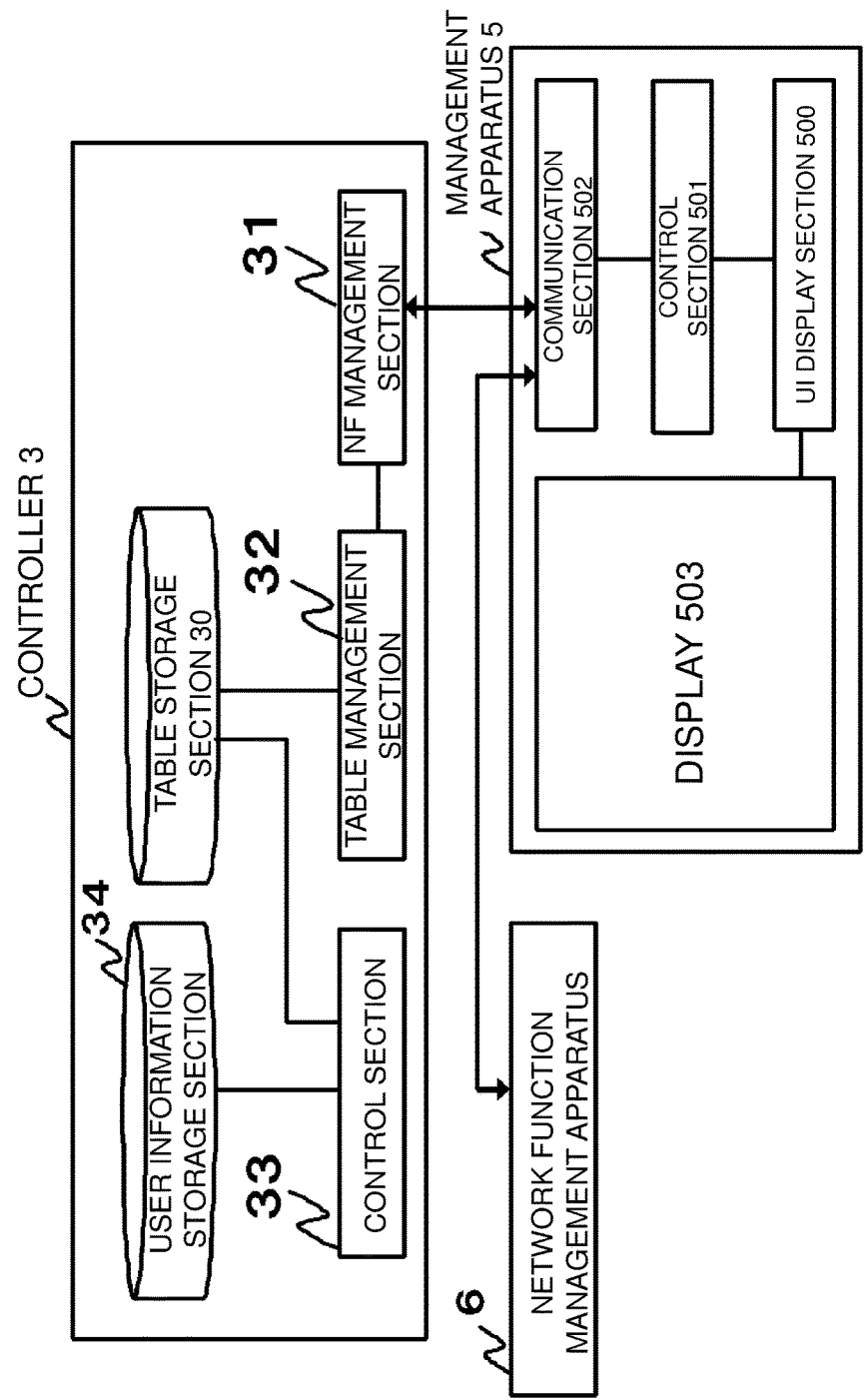
FIG. 26 is a diagram showing an example of the structure of a system according to a fifth exemplary embodiment of the present invention.

FIG. 26 shows examples of configurations according to the fifth exemplary embodiment. The controller 3 and network function management apparatus 6 are similar to the examples of configurations shown in the above-described exemplary embodiments, and a detailed description thereof will be omitted. Moreover, an example of the structure of the communication system is similar to that of FIG. 1.

For example, the management apparatus 5 is an apparatus for managing the NFs 2 and network function groups in coordination with the controller 3 and network function management apparatus 6. Although the management apparatus 5, controller 3, and network function management apparatus 6 are discrete apparatuses in the example of FIG. 26, the functionality of the controller 3 or network function management apparatus 6 may be implemented on the management apparatus 5.

The management apparatus 5 includes a UI (User Interface) display section 500, a control section 501, a communication section 502, and a display 503.

The UI display section 500 has a function of displaying a UI for a user (the operation manager or the like) of the management apparatus 5 to operate on the display 503. The display 503 may be incorporated in the management apparatus 5 or may be another device separate from the management apparatus 5.

The communication section 502 has a function of communicating with the controller 3 and network function management apparatus 6. The control section 501 and UI display section 500 communicate with the controller 3 and network function management apparatus 6 via the communication section 502.

For example, the control section 501 exchanges information related to the network function groups and NFs 2 with the controller 3 and network function management apparatus 6 via the communication section 502. For example, the control section 501 exchanges the network function group management table 110 or 110-2 with the controller 3. Moreover, for example, the control section 501 exchanges information related to the NFs present in the communication system (e.g., information concerning the types of the NFs, such as CPE and BRAS) with the network function management apparatus 6. For example, the UI display section 500 uses the above-described information received from the controller 3 and network function management apparatus 6 to display the UI for the operation manager to operate on the display 503.

The control section 501 can generate information related to a network function group (e.g., a group ID, pseudo network addresses corresponding to the group, the types of the NFs 2 included in the group, the connection structure of the NFs 2 included in the group, and the like). For example, the control section 501 generates the above-described information when a new network function group is created by an operator, a change occurs in the configuration of a group, or the like. For example, the table management section 32 of the controller 3 receives the information generated by the control section 501 from the management apparatus 5. For example, the table management section 32 can create, change, or update the group management table 110, based on the received information.

The control section 501 can instruct the controller 3 to control the communication apparatuses 1 or NFs 2. For example, the control section 501 can instruct the controller 3 to create, change, or update the packet processing tables 111 of the communication apparatuses 1. Moreover, for example, the control section 501 can instruct the controller 3 to create, change, or update the routing tables 20 of NFs 20. The control section 33 of the controller 3 controls the communication apparatuses 1 and NFs 2 in accordance with such indications from the management apparatus 5.

Figure 27:
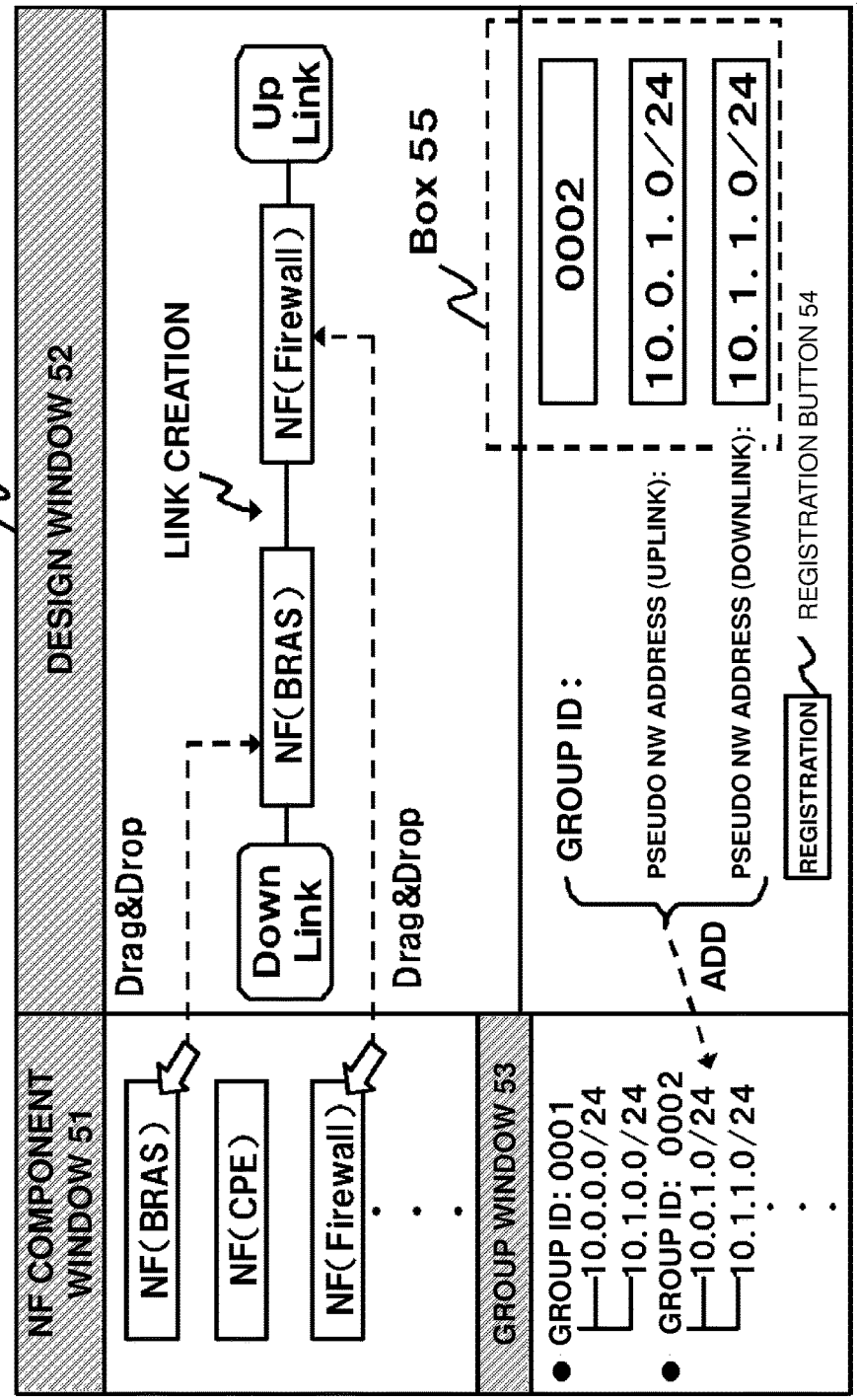
FIG. 27 is a diagram showing an example of a user interface of the system according to the fifth exemplary embodiment.

FIG. 27 shows an example of a design GUI 50 that the UI display section 500 displays on the display 503. The operation manager uses the design GUI 50 to manage network function groups. Note that the design GUI 50 shown in FIG. 27 is an example, and the present invention is not limited to the GUI shown in FIG. 27.

For example, the design GUI 50 includes a NF component window 51, a design window 52, and a group window 53.

For example, the NF component window 51 displays icons each representing NFs 2 that are present in the communication system and that can be operated by the operation manager. In the example of FIG. 27, icons representing BRAS, CPE, and Firewall are displayed as NFs 2. For example, the UI display section 500 displays icons based on information (the types of the NFs 2 present in the system, and the like) acquired from the network function management apparatus 6.

For example, the operation manager can select an icon displayed in the window 51 by clicking it with a mouse or the like and move the icon into the design window 52 through a "drag & drop" operation.

For example, the operation manager can create a network function group by performing an operation for linking icons moved into the design window 52. In the example of FIG. 27, icons "Downlink" and "Uplink" displayed in the design window 52 correspond to the access network (A) and core network (B) shown in the example of the communication system of FIG. 1, respectively.

For example, when the operation manager clicks a registration button 54 displayed in the design window 52, the control section 501 generates information related to the created network function group (e.g., a group ID, pseudo network addresses, and the like) and displays it in a Box 55. Note that the information such as a group ID and pseudo network addresses may be created by the controller 3. If these pieces of information are created by the controller 3, the control section 501 receives the information from the controller 3 and displays it in the Box 55.

For example, the ID and pseudo network addresses of the registered network function group are added into the group window 53.

For example, the control section 501 refers to the group management table 110 acquired from the controller 3 and determines pseudo network addresses to assign to a newly created group from among those network addresses that are not assigned to already existing groups. For example, the control section 501 determines pseudo network addresses to correspond to the uplink and downlink communication directions, respectively. The determined pseudo network addresses are displayed in the Box 55. Moreover, the control section 501 may automatically determine an ID to assign to the newly created group. The determined ID is displayed in the Box 55. Note that if a group ID and pseudo network addresses are created by the controller 3 as described above, for example, the table management section 32 of the controller 3 determines the group ID and pseudo network addresses through operations similar to those of the control section 501 described above.

For example, the control section 501 notifies the table management section 32 of the controller 3 that a network function group is newly created. Moreover, the control section 501 sends information related to the newly created network function group (e.g., NFs 2 belonging to the group, the connection structure of the NFs 2, pseudo network addresses, and the like) to the controller 3 via the communication section 502. For example, the NF management section 31 and table management section 32 of the controller 3 updates the network function group management table 110, based on the information received from the management apparatus 5. For example, the control section 33 of the controller 3 can create, change, or update the routing tables 20 of the NFs 2 in response to the notification from the control section 501, based on the information related to the newly created group. Moreover, for example, the control section 33 of the controller 3 can create, change, or update the packet processing tables 111 of the communication apparatuses 1 in response to the notification from the control section 501, based on the information related to the newly created group. Note that it is also possible that the functionality of the controller 3 is implemented on the management apparatus 5, and the management apparatus 5 directly controls the communication apparatuses 1 and NFs 2.

Figure 28:
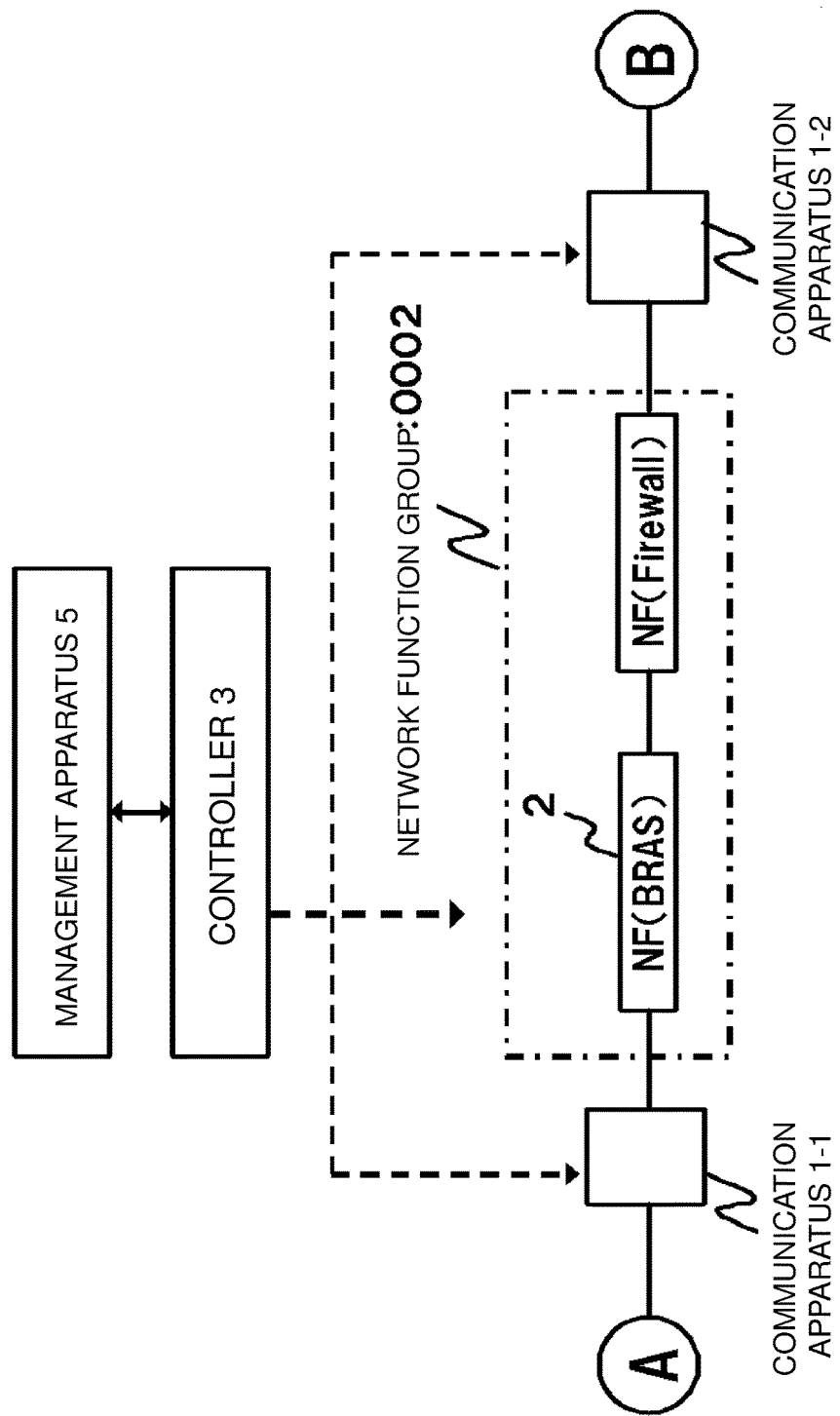
FIG. 28 is a diagram showing an example of a network function group in the system according to the fifth exemplary embodiment.

FIG. 28 shows an example of the structure of the communication system including a newly created network function group. In response to the fact that a new group is created via the management apparatus 5, the controller 3 controls the communication apparatuses 1 (the communication apparatus 1-1 on the access network (A) side and the communication apparatus 1-2 on the core network (B) side) and NFs 2 (NF (BRAS) and NF (Firewall)).

The control section 501 notifies the controller 3 of a user to be assigned to the newly added group. For example, the operator inputs a list of users to be assigned to the group to the management apparatus 5. The control section 501 of the management apparatus 5 can notify the input list to the controller 3. The controller 3 updates the user information storage section 34, based on the list notified from the management apparatus 5. The controller 3 sets a new entry in the packet processing tables 111 of the communication apparatuses 1-1 and 1-2, based on the IDs of the users assigned to the group and information concerning the group (the connection structure of the NFs 2 in the group and the like) sent from the management apparatus 5. Moreover, the controller 3 sets an entry in the routing tables 20 of the NFs 2 belonging to the newly added group. Note that a method for configuring the packet processing tables 111 of the communication apparatuses 1-1 and 1-2 and a method for configuring the routing table 20 of each NF 2 by the controller 3 are similar to those of the above-described exemplary embodiments, and therefore a detailed description thereof will be omitted. Note that the controller 3 may control the communication apparatuses 1 and NFs 2 via the network control apparatus 4.

Figure 29:
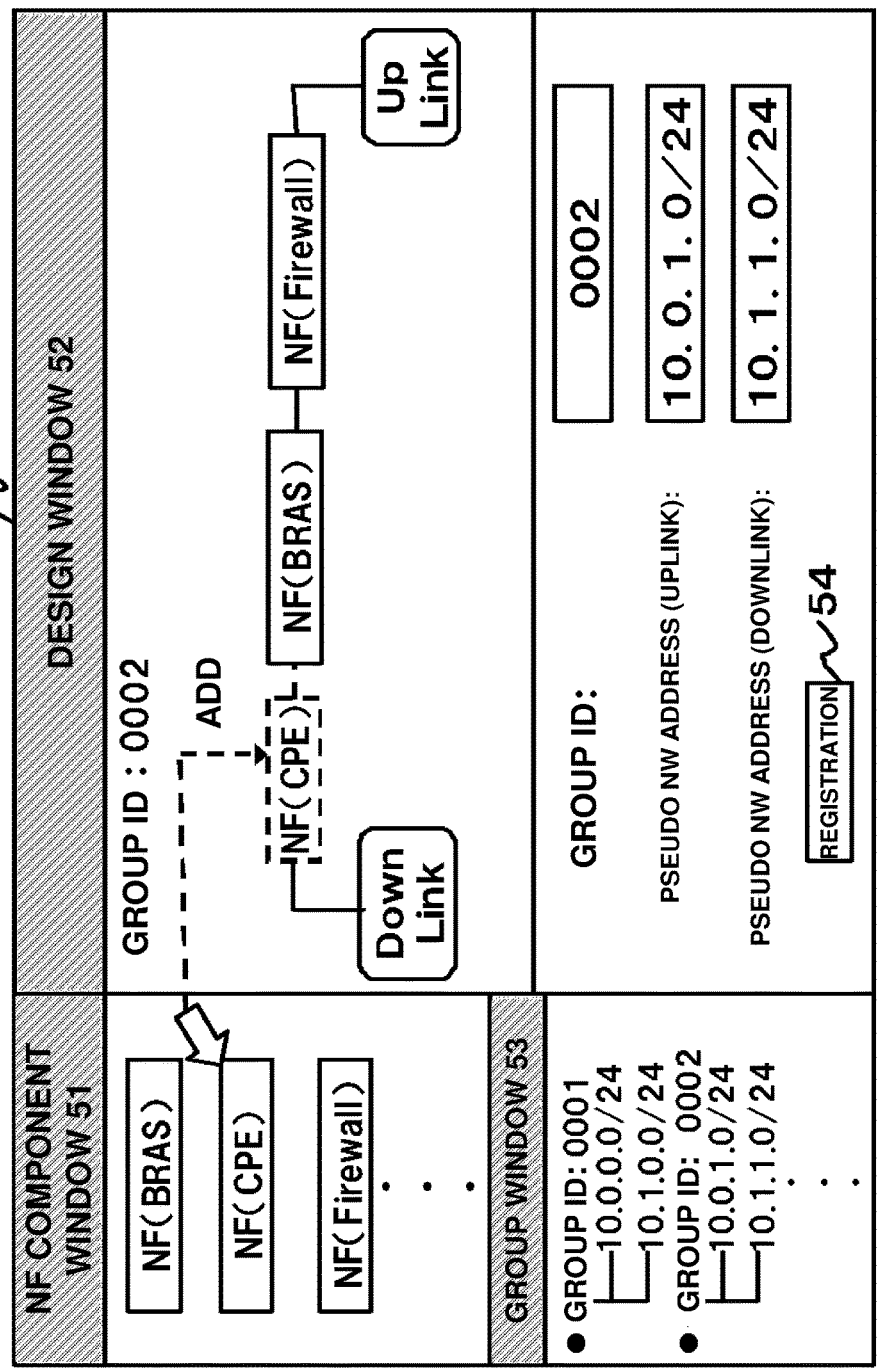
FIG. 29 is a diagram showing an example of a user interface in another example of the architecture of the system according to the fifth exemplary embodiment.

FIG. 29 shows an example of newly adding a NF 2 to an already existing network function group via the management apparatus 5.

The example of FIG. 29 shows that NF (CPE) is added to a group of group ID "0002".

For example, when the operation manager clicks a group ID displayed in the group window 53, the UI display section 500 displays those NFs that belong to a group corresponding to the clicked ID in the design window 52. In the example of FIG. 29, NF (BRAS) and NF (Firewall) are included in the group of group ID "0002". Moreover, in response to the operation manager's clicking of the group ID displayed in the group window 53, the UI display section 500 may display information (pseudo network addresses and the like) concerning the group corresponding to the clicked ID.

For example, the operation manager moves NF (CPE) into the design window 52 by "drag & drop" and creates a link between the NF (CPE) and NF (BRAS) and between the NF (CPE) and "Downlink" icon, whereby NF (CPE) is added to the group. For example, the operation manager clicks the registration button 54, whereby the addition of NF (CPE) to the group is reflected. The control section 501 of the management apparatus 5 sends the controller 3 information related to the updated network group (e.g., the types of the NFs belonging to the type of the group, the connection structure of the NFs in the group, pseudo network addresses, and the like) to the controller 3 via the communication section 502. For example, the NF management section 31 and table management section 32 of the controller 3 updates the network function group management table 110, based on the information received from the management apparatus 5. Moreover, the control section 501 notifies the controller 3 that the connection structure of the NFs 2 in the group has been updated, and the controller 3, in response to this notification, controls the communication apparatuses 1 and NFs 2. Note that it is also possible that the functionality of the controller 3 is implemented on the management apparatus 5, and the management apparatus 5 directly controls the communication apparatuses 1 and NFs 2.

Figure 30:
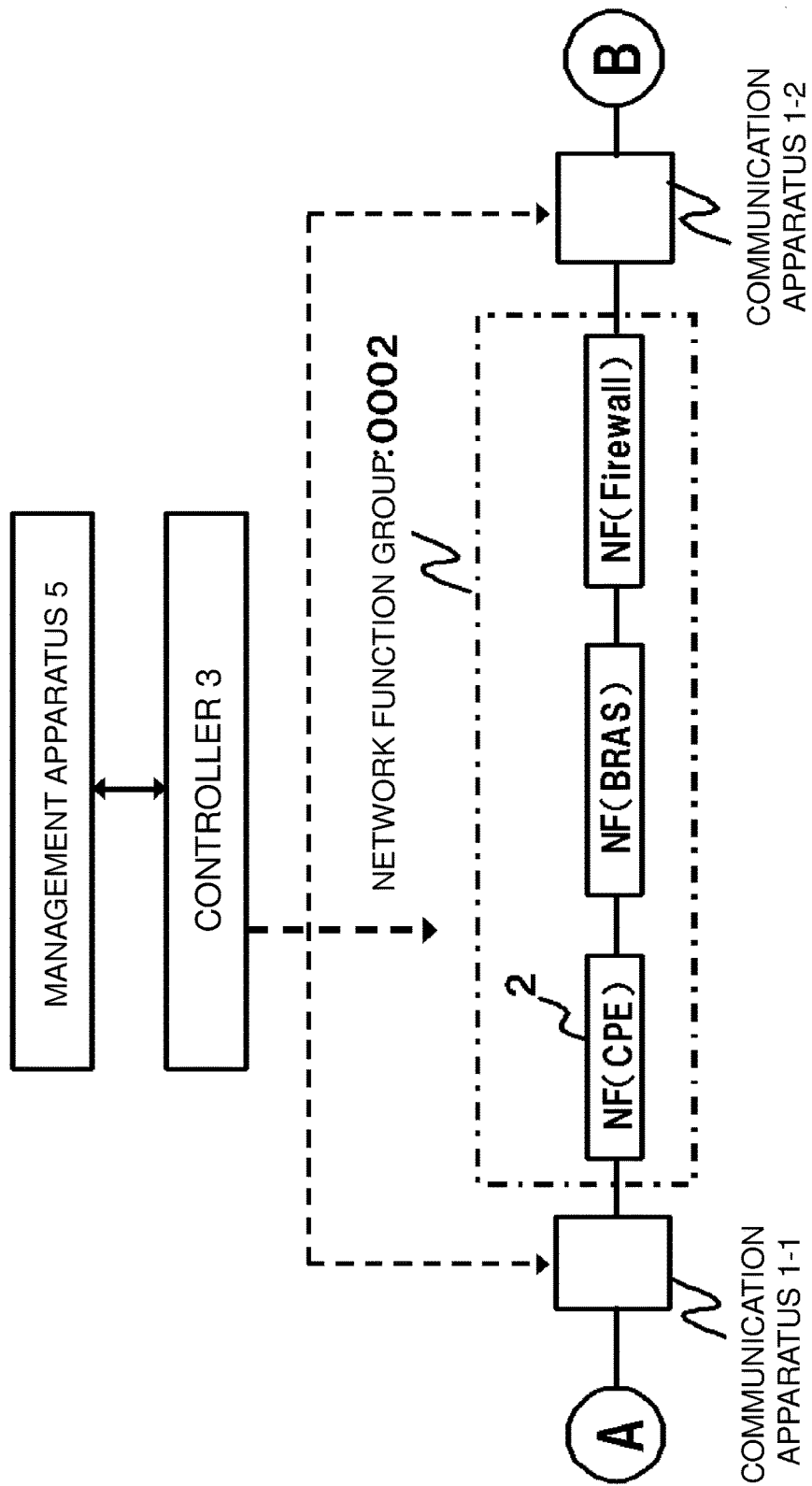
FIG. 30 is a diagram showing another example of a network function group in the system according to the fifth exemplary embodiment.

FIG. 30 shows an example of the structure of the communication system including a newly created network function group. In response to the fact that a new group is created via the management apparatus 5, the controller 3 controls the communication apparatuses 1 (the communication apparatus 1-1 on the access network (A) side and the communication apparatus 1-2 on the core network (B) side) and NFs 2 (NF (CPE), NF (BRAS), and NF (Firewall)).

The control section 501 notifies the controller 3 of a user to be assigned to the newly added group. For example, the operator inputs a list of users to be assigned to the group to the management apparatus 5. The control section 501 of the management apparatus 5 can notify the input list to the controller 3. The controller 3 updates the user information storage section 34, based on the list notified from the management apparatus 5. The controller 3 sets a new entry in the packet processing tables 111 of the communication apparatuses 1-1 and 1-2, based on the IDs of the users assigned to the group. Moreover, the controller 3 sets an entry in the routing table 20 of each NF 2. Note that a method for configuring the packet processing tables 111 of the communication apparatuses 1-1 and 1-2 and a method for configuring the routing table 20 of each NF 2 by the controller 3 are similar to those of the above-described exemplary embodiments, and therefore a detailed description thereof will be omitted. Note that the controller 3 may control the communication apparatuses 1 and NFs 2 via the network control apparatus 4.

As described above, according to the fifth exemplary embodiment, the controller 3 or network control apparatus 4 can autonomously control the communication apparatuses 1 and NFs 2 in response to the operation manager's operation of the GUI. Accordingly the efficiency in system operation of the operation manger is enhanced.

Sixth Exemplary Embodiment

A sixth exemplary embodiment of the present invention will be described. In the sixth exemplary embodiment, it is possible to apply at least one of the above-described first to fifth exemplary embodiments.

In the sixth exemplary embodiment, each NF 2 performs label-based packet forwarding by using the MPLS (Multi Protocol Label Switching) technology or the like. Each NF 2 performs label-based packet forwarding, whereby it is possible to support not only IP (Internet Protocol) but also other-layer protocols.

Figure 31:
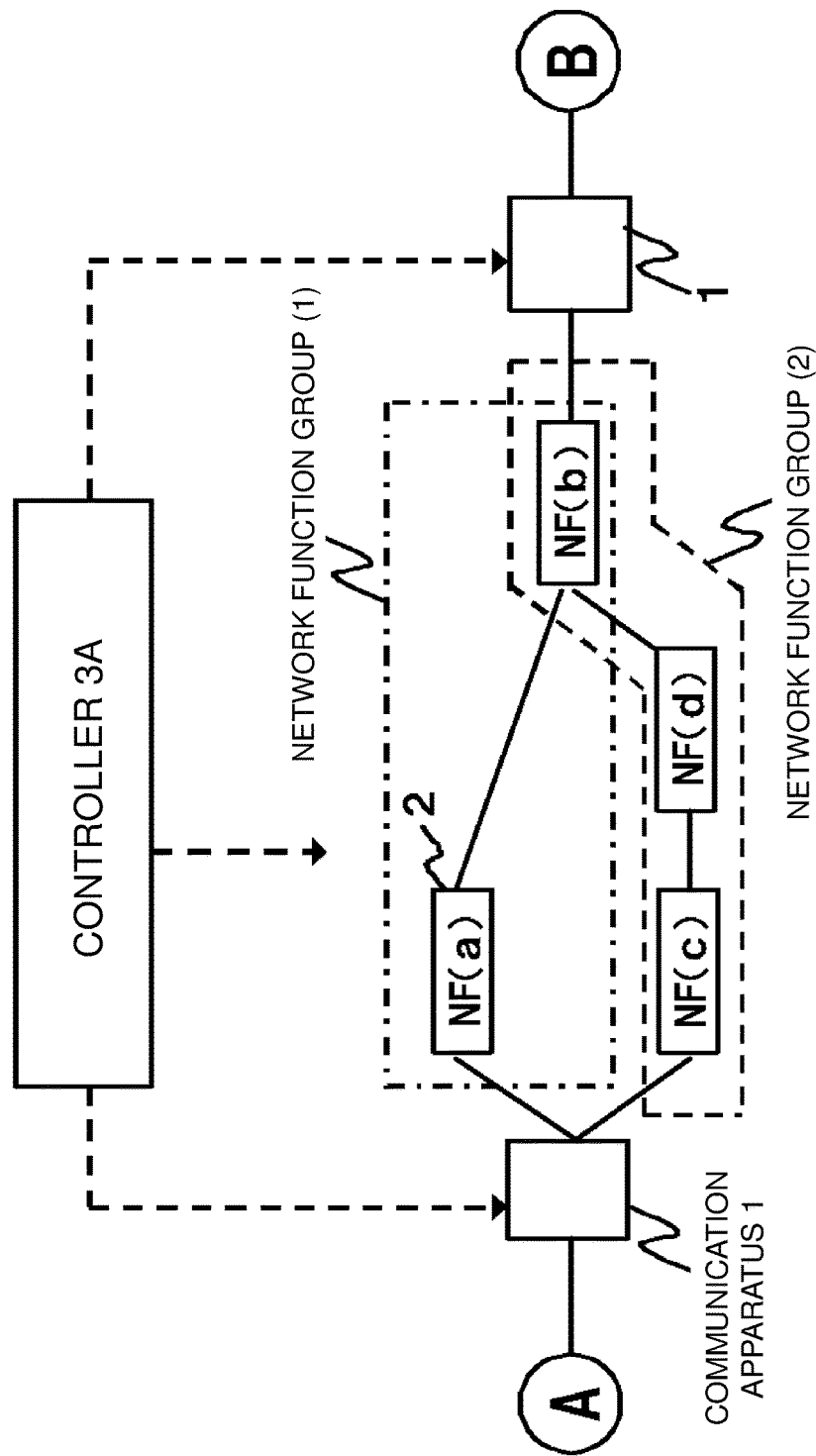
FIG. 31 is a diagram showing an example of the structure of a system according to a sixth exemplary embodiment of the present invention.

FIG. 31 shows an example of the structure of a system according to the sixth exemplary embodiment. In the sixth exemplary embodiment, a controller 3A is provided. Moreover, each NF 2 and communication apparatus 1 can perform label-based packet forwarding. The structure of the communication system is similar to the examples shown in FIG. 1 and others in the above-described exemplary embodiments.

Figure 32:
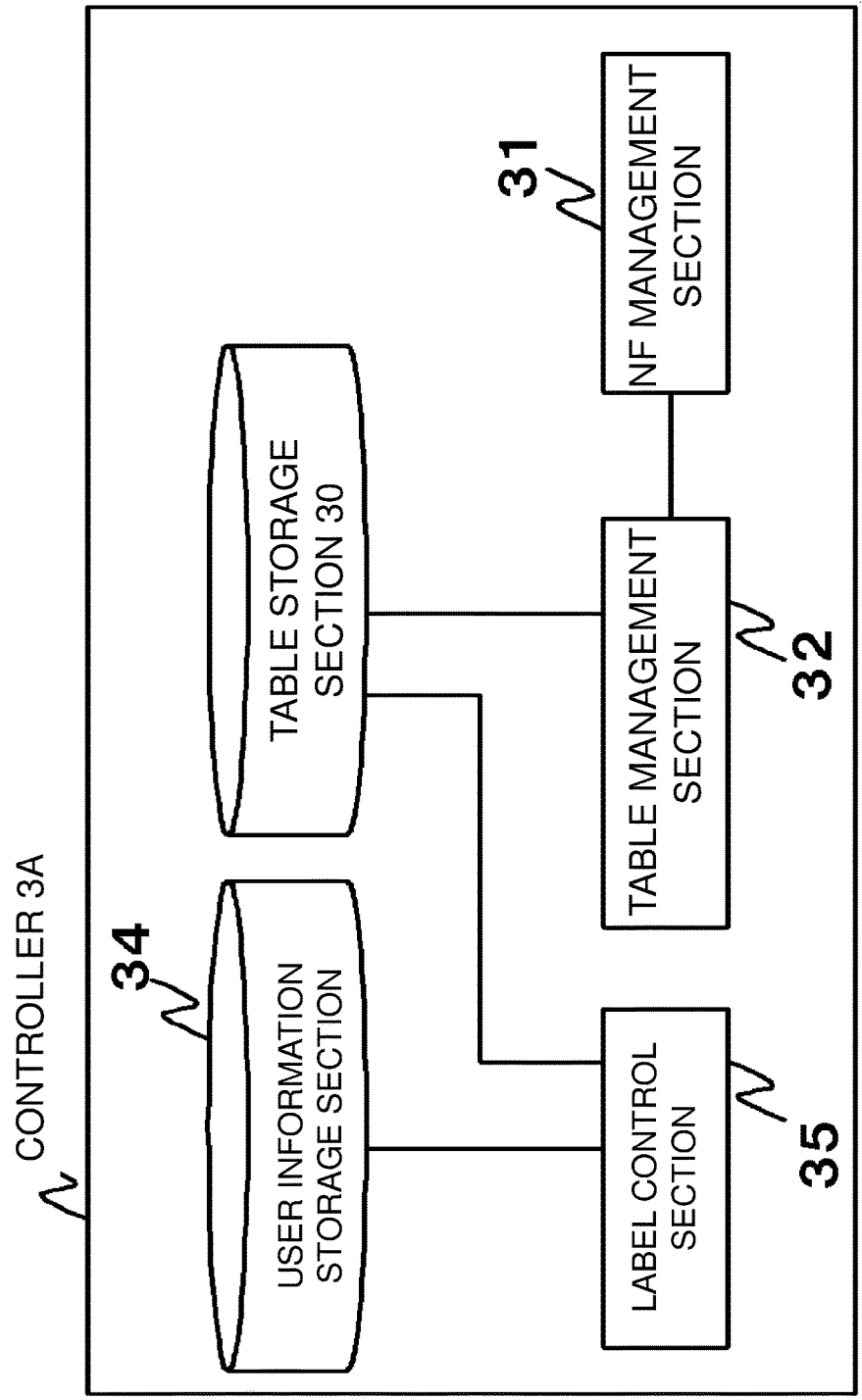
FIG. 32 is a diagram showing an example of the configuration of a controller.

FIG. 32 shows an example of the configuration of the controller 3A. The controller 3A includes a label control section 35 in place of the control section 33. The other configuration is similar to those of the above-described exemplary embodiments, and therefore a description thereof will be omitted.

The label control section 35 controls labels used for the communication apparatuses 1 and NFs 2 to forward packets, based on the group management table 110 and user management table 112.

For example, the label control section 35 refers to the group management table 110 and user management table 112 and learns correspondences between users and network function groups. The label control section 35 sets an entry for adding a label to (or deleting a label from) a packet of interest in the packet processing tables 111 of the communication apparatuses 1, based on the correspondences between users and network function groups.

For example, the label control section 35 refers to the group management table 110 and learns pseudo network addresses corresponding to each network function group. The label control section 35 sets an entry for label-based packet forwarding in the routing table 20 of each NF 20, based on the respective pseudo network addresses mapped to the groups.

FIGS. 33 and 34 show examples of packet processing tables 111-2 and 111-3 in the sixth exemplary embodiment. The table 111-2 is the table of the communication apparatus 1 on the access network (A) side, and the table 111-3 is the table of the communication apparatus 1 on the core network (B) side.

FIG. 35 shows an example of routing tables 20-2 in the sixth exemplary embodiment.

The group management table 110 is similar to the examples shown in FIG. 3 and others in the above-described exemplary embodiments.

In the examples of FIGS. 33 to 35, the label control section 35 decides on "A", "B" and "C" as labels to be used for packets belonging to a network function group (1) (packets from the access network (A) to the core network (B)). Moreover, the label control section 35 decides on "Z", "Y" and "X" as labels to be used for packets belonging to the group (1) (packets from the core network (B) to the access network (A)).

In the examples of FIGS. 33 to 35, the label control section 35 decides on "a", "b" and "c" as labels to be used for packets belonging to a network function group (2) (packets from the access network (A) to the core network (B)). Moreover, the label control section 35 decides on "z", "y", "x" and "w" as labels to be used for packets belonging to the group (2) (packets from the core network (B) to the access network (A)).

The label control section 35 learns the correspondences between users and groups and the IDs of the users (e.g., the users' IP addresses), based on the group management table 110 and user management table 112. The label control section 35, based on the information it has learnt, sets an entry for instruction to add label "A" to a packet belonging to the group (1) in the packet processing table 111-2, as in the example of FIG. 33. In the example of FIG. 33, the label control section 35 sets an entry for instruction to add label "A" to a packet whose source is "100.64.1.1". Moreover, the label control section 35 sets in the packet processing table 111-3 an entry for instruction to delete a label when a packet belonging to the group (1) is received from the access network (A) side, as in the example of FIG. 34. In the example of FIG. 34, the label control section 35 sets an entry for instruction to delete a label of a packet whose source is "100.64.1.1".

The label control section 35 sets an entry for instruction to add label "Z" to a packet belonging to the group (1) in the packet processing table 111-3, as in the example of FIG. 34. In the example of FIG. 34, the label control section 35 sets an entry for instruction to add label "Z" to a packet whose destination is "100.64.1.1". Moreover, the label control section 35 sets in the packet processing table 111-2 an entry for instruction to delete a label when a packet belonging to the group (1) is received from the core network (B) side, as in the example of FIG. 33. In the example of FIG. 33, the label control section 35 sets an entry for instruction to delete a label of a packet whose destination is "100.64.1.1".

The label control section 35 makes settings similar to the foregoing, with respect to packets belonging to the group (2).

The label control section 35 sets an entry in the routing table 20 of each NF. The label control section 35 sets an entry for instruction to select a next hop depending on "In Label" in the example of FIG. 35, that is, a label added to a received packet, and to change the label of the packet to forward, to a label indicated in "Out Label".

Referring to the example of FIG. 35, the NF (a) belonging to the group (1), in accordance with an entry set by the label control section 35, determines that a next hop is NF (b), based on label "A" that has been added to a packet by the communication apparatus 1-1, and changes the label of the packet to forward to the NF (b) to "B". Moreover, the NF (b) belonging to the group (1), in accordance with an entry set by the label control section 35, determines that a next hop is the communication apparatus 1-2, based on the label "B" added by the NF (a), and changes the label of the packet to forward to the communication apparatus 1-2 to "C". The communication apparatus 1-2 having received the packet with the label "C" added thereto deletes the label "C" in accordance with the packet processing table 111 of FIG. 34.

Other NFs 2 illustrated in FIG. 35 operate as in the above description.

In the above-described example, an example of the architecture is described in which the communication system includes communication apparatuses 1. However, the present invention is not limited to the above-described example. For example, an architecture will do in which no communication apparatus 1 is included. In this case, it is only necessary that, for example, NFs 2 at the edges of each network function group (e.g., NF (c) and NF (b) in the group (2) in the example of FIG. 31) should have functions similar to those of the communication apparatuses 1.

As described above, according to the sixth exemplary embodiment, each NF 2 performs label-based packet forwarding by using the MPLS technology or the like. Each NF 2 performs label-based packet forwarding, whereby it is possible to support not only IP (Internet Protocol) but also other-layer protocols. Moreover, since a label is determined with respect to a pseudo network address corresponding to a network function group, the effect can be obtained that the number of entries set in the communication apparatuses 1 and NFs 2 can be reduced. It is conceivable that the number of entries can be enormous if labels are determined based on destination addresses, which can exist in unlimited numbers depending on communication. However, in the sixth exemplary embodiment, the destination addresses of communication are virtually aggregated by using a pseudo network address that is assigned to a network function group, and each NF 2 performs packet routing based on such a pseudo network address. Destination addresses are aggregated into a pseudo network address, whereby the number of entries in the routing table of each NF 2 is compressed.

Seventh Exemplary Embodiment

A seventh exemplary embodiment of the present invention will be described. In the seventh exemplary embodiment, it is possible to apply at least one of the above-described first to sixth exemplary embodiments.

In the seventh exemplary embodiment, each NF 2 performs label-based packet forwarding by using the MPLS technology or the like as in the sixth exemplary embodiment. In the seventh exemplary embodiment, each NF 2 further use the MPLS-VPN (Virtual Private Network) technology or the like, whereby it is possible to enhance security of communication.

Figure 36:
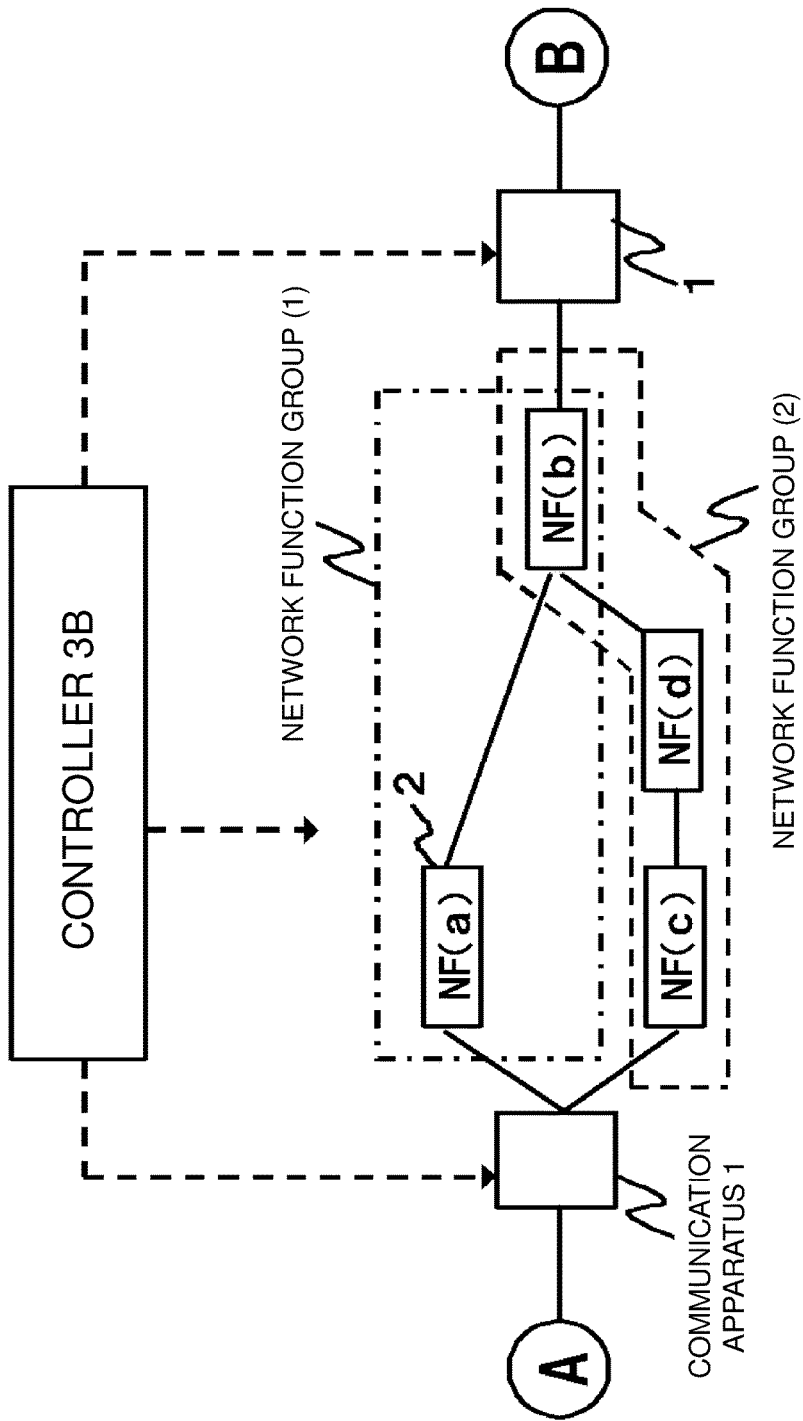
FIG. 36 is a diagram showing an example of the structure of a system according to a seventh exemplary embodiment of the present invention.

FIG. 36 shows an example of the structure of a system according to the seventh exemplary embodiment. In the seventh exemplary embodiment, a controller 3B is provided. Moreover, each NF 2 and communication apparatus 1 can perform label-based packet forwarding. The architecture of the communication system is similar to the examples shown in FIG. 1 and others in the above-described exemplary embodiments. A label control section 35 of the controller 3B can control a label for VPN to be added to a packet, in addition to the functions described in the sixth exemplary embodiment. Of the functions of the label control section 35, a description of the functions described in the sixth exemplary embodiment will be omitted.

The label control section 35 determines a virtual network label to correspond to each network function group. The label control section 35 sets in the communication apparatuses 1 and NFs 2 an entry related to the addition and deletion of a virtual network label.

FIGS. 37 and 38 show examples of packet processing tables 111-4 and 111-5 in the seventh exemplary embodiment. The table 111-4 is the table of the communication apparatus 1 on the access network (A) side, and the table 111-5 is the table of the communication apparatus 1 on the core network (B) side.

FIG. 39 shows an example of routing tables 20-3 in the seventh exemplary embodiment.

In the examples of FIGS. 37 to 39, the label control section 35 decides on "α" as a virtual network label to be used for packets belonging to the network function group (1).

In the examples of FIGS. 37 to 39, the label control section decides on "β" as a virtual network label to be used for packets belonging to the network function group (2).

The other functions of the label control section 35 are similar to those described in the sixth exemplary embodiment, and therefore a detailed description thereof will be omitted.

The control apparatuses 1 add or delete a virtual network label in accordance with the respective packet processing tables 111-4 and 111-5 configured by the label control section 35.

Each NF 2 forwards a packet based on labels added to the packet. Note that each NF 2 forwards a packet without changing a virtual network label added to the packet. Accordingly, the value of a virtual network label of a packet is not changed while the packet passes through NFs 2.

For example, the communication apparatuses 1 can separate communication interfaces used for packet forwarding, depending on virtual network labels. Moreover, each NF 2 can separate communication interfaces used for packet forwarding, depending on virtual network labels. In other words, packets passing via NFs 2 are virtually separated depending on virtual network labels. Accordingly, communications are separated on a network function group basis, and security of communication is improved.

The other functions of the communication apparatuses 1 and NFs 2 are similar to those described in the sixth and other exemplary embodiments, and therefore a detailed description thereof will be omitted.

In the above-described example, an example of the architecture is described in which the communication system includes communication apparatuses 1. However, the present invention is not limited to the above-described example. For example, an architecture will do in which no communication apparatus 1 is included. In this case, it is only necessary that, for example, NFs 2 at the edges of each network function group (e.g., NF (c) and NF (b) in the group (2) in the example of FIG. 36) should have functions similar to those of the communication apparatuses 1.

As described above, according to the seventh exemplary embodiment, each NF 2 further uses the MPLS-VPN technology or the like, whereby it is possible to enhance security of communication.

Exemplary embodiments of the present invention have been described hereinabove, but the present invention is not limited to the above-described individual exemplary embodiments. The present invention can be implemented based on modification, replacement, and arrangement of each exemplary embodiment. Moreover, the present invention can also be implemented by arbitrarily combining each exemplary embodiment. That is, the present invention incorporates various modifications and amendments that can be accomplished based on all of the disclosed content and technical ideas of the present description.

REFERENCE SIGNS LIST

1 Communication apparatus
10 Packet processing section
11 Forwarding section
110 Group management table
111 Packet processing table
112 User management table
12 Table storage section
2 Network function (NF)
20 Routing table
21 Packet forwarding section
22 Network functionality execution section
200 Network device
3 Controller
3A Controller
3B Controller
30 Table storage section
31 NF management section
32 Table management section
33 Control section
34 User information storage section
4 Network control apparatus
40 Table storage section
41 Control interface
42 NW control section
5 Management apparatus
50 Design GUI
51 NF component window
52 Design window
53 Group window
54 Registration button
55 Box
500 UI display section
501 Control section
502 Communication section
503 Display
6 Network function management apparatus
60 Communication section
61 VM manager

The invention claimed is:

1. A communication system comprising:
    a plurality of network devices, each of which executes at least one network function to provide at least one communication service; and
    a communication device comprising:
        a memory storing identification information corresponding to a pseudo network address that is assigned to a predetermined group of network functions, wherein the predetermined group includes at least one network function assigned to each of user identifiers; and
        a packet processor configured to execute instructions to:
            add the identification information to a packet belonging to the predetermined group, and
            send the packet to the predetermined group of network functions,
        wherein packet forwarding within the predetermined group is performed based on the identification information, wherein different addresses belonging to the pseudo network address, as pseudo addresses, are assigned to different user identifiers to identify each user identifier within the predetermined group.

2. The communication system according to claim 1, wherein the packet processor is further configured to execute the instructions to send the packet to the predetermined group of network functions by translating a destination address of the packet to the identification information.

3. The communications system according to claim 1, wherein the packet processor is further configured to execute the instructions to send the packet to the predetermined group of network functions by translating a destination address of the packet to an address belonging to the pseudo network address.

4. The communications system according to claim 1, wherein the packet processor is further configured to execute the instructions to send the packet to the predetermined group of network functions by translating a destination address of the packet to an address belonging to the pseudo network address in response to formation of the predetermined group.

5. The communications system according to claim 1, wherein the packet processor is further configured to execute the instructions to send the packet to the predetermined group of network functions by forwarding the packet to which the identification information is added, wherein the predetermined group is formed of a plurality of types of the network functions.

6. The communications system according to claim 1, wherein the packet processor is further configured to execute the instructions to:
    translate a destination address of the packet to an address belonging to the pseudo network address, and
    send the packet to the predetermined group of network functions,
    wherein the packet forwarding within the predetermined group is performed by:

referring to a table including information indicating a forward destination corresponding to the address; and forwarding the packet to the forward destination corresponding to the address.

7. The communications system according to claim 1, wherein the packet processor is further configured to execute the instructions to send the packet to the predetermined group of network functions, wherein a forward destination corresponding to the identification information is changed in response to a change in a network function included in the predetermined group.

8. The communications system according to claim 1, wherein the packet processor is further configured to execute the instructions to send the packet to the predetermined group of network functions, wherein a forward destination mapped to the identification information is changed in response to a change in a connection structure of a plurality of the network functions on the plurality of network devices.

9. The communications system according to claim 1, wherein the packet processor is further configured to execute the instructions to restore a destination address that has been translated into the identification information, to an address before translation.

10. A communication apparatus comprising:
a memory storing identification information corresponding to a pseudo network address that is assigned to a predetermined group of network functions, wherein the predetermined group includes at least one network function assigned to each of user identifiers; and
a packet processor configured to execute instructions to:
add the identification information to a packet belonging to the predetermined group, and
send the packet to the predetermined group of network functions,
wherein packet forwarding within the predetermined group is performed based on the identification information, wherein different addresses belonging to the pseudo network address, as pseudo addresses, are assigned to different user identifiers to identify each user identifier within the predetermined group.

11. The communication apparatus according to claim 10, wherein the packet processor is further configured to execute the instructions to send the packet to the predetermined group of network functions by translating a destination address of the packet to the identification information.

12. The communication apparatus according to claim 10, wherein the packet processor is further configured to execute the instructions to send the packet to the predetermined group of network functions by translating a destination address of the packet to an address belonging to the pseudo network address.

13. The communication apparatus according to claim 10, wherein the packet processor is further configured to execute the instructions to send the packet to the predetermined group of network functions by translating a destination address of the packet to an address belonging to the pseudo network address.

14. The communication apparatus according to claim 10, wherein the packet processor is further configured to execute the instructions to add the identification information to the packet to forward it to the predetermined group of network functions, wherein the group is formed of a plurality of types of the network functions.

15. The communication apparatus according to claim 10, wherein
the packet processor is further configured to execute the instructions to:
translate a destination address of the packet to an address belonging to the pseudo network address, and
send the packet to the predetermined group of network functions,
wherein the packet forwarding within the predetermined group is performed by:
referring to a table including information indicating a forward destination corresponding to the address; and
forwarding the packet to the forward destination corresponding to the address.

16. The communication apparatus according to claim 10, wherein the packet processor is further configured to execute the instructions to send the packet with the second identification information added thereto to the predetermined group of network functions, wherein a forward destination corresponding to the identification information is changed in response to a change in a network functions included in the predetermined group.

17. The communication apparatus according to claim 10, wherein the packet processor is further configured to execute the instructions to send the packet with the second identification information added thereto to the predetermined group of network functions, wherein a forward destination corresponding to the identification information is changed in response to a change in a connection structure of a plurality of the network functions.

18. The communication apparatus according to claim 10, wherein the packet processor is further configured to execute the instructions to restore a destination address that has been translated into the identification information, to an address before translation.

19. A control apparatus comprising:
a memory storing identification information corresponding to a pseudo network address that is assigned to a predetermined group of network functions, wherein the predetermined group includes at least one network function assigned to each of user identifiers; and
a controller that is configured to instruct a communication apparatus to:
add the identification information to a packet belonging to the predetermined group, and
send the packet to the predetermined group of network functions,
wherein the controller is further configured to instruct at least one network function in the predetermined group to perform packet forwarding within the predetermined group based on the second identification information, wherein different addresses belonging to the pseudo network address, as pseudo addresses, are assigned to different user identifiers to identify each user identifier within the predetermined group.

20. The control apparatus according to claim 19, wherein the controller is further configured to instruct the communication apparatus to send the packet to the predetermined group of network functions by translating a destination address of the packet to the identification information.

21. The control apparatus according to claim 19, wherein the controller is further configured to instruct the communication apparatus to send the packet to the predetermined group of network functions by translating a destination address of the packet to an address belonging to the pseudo network address.

22. The control apparatus according to claim 19, wherein the controller is further configured to instruct the communication apparatus to send the packet to the predetermined group of network functions by translating a destination address of the packet to an address belonging to the pseudo network address in response to formation of the predetermined group.

23. The control apparatus according to claim 19, wherein controller is further configured to instruct the communication apparatus to add the identification information to the packet to forward it to the predetermined group of network functions, wherein the group is formed of a plurality of types of the network functions.

24. The control apparatus according to claim 19, wherein the controller is further configured to instruct the communication apparatus to:
translate a destination address of the packet to an address belonging to the pseudo network address;
send the packet to the predetermined group of network functions,
wherein the packet forwarding within the predetermined group is performed by:
referring to a table including information indicating a forward destination corresponding to the address; and
forwarding the packet to the forward destination corresponding to the address.

25. The control apparatus according to claim 19, wherein the controller is further configured to instruct the at least one network functions to change a forward destination corresponding to the identification information in response to a change in a network function included in the predetermined group.

26. The control apparatus according to claim 19, wherein the controller is further configured to instruct the at least one network function to change a forward destination mapped to the identification information in response to a change in a connection structure of a plurality of the network functions.

27. The control apparatus according to claim 19, wherein the controller is further configured to instruct the communication apparatus to restore a destination address that has been translated into the identification information, to an address before translation.

28. A network device comprising:
a memory storing a routing table which is used to forward a packet to a network function belonging to a predetermined group of network functions providing communication services, based on identification information corresponding to a pseudo network address that is assigned to the predetermined group of network functions, wherein the predetermined group includes at least one network function assigned to each of user identifiers; and
at least one processor configured to execute instructions to:
perform communication processing on a packet to which the identification information is added, wherein the communication processing is performed by the network function; and
forward the packet to another network function belonging to the predetermined group of network functions, based on the identification information, wherein different addresses belonging to the pseudo network address, as pseudo addresses, are assigned to different user identifiers to identify each user identifier within the predetermined group.

29. The network device according to claim 28, wherein the processor is further configured to execute instructions to perform the communication processing to be performed by the network function, on the packet whose destination address has been translated into the second identification information.

30. The network device according to claim 28, wherein the processor is further configured to execute instructions to perform the communication processing to be performed by the network function, on the packet whose destination address has been translated into an address belonging to the pseudo network address.

31. The network device according to claim 28, wherein the processor is further configured to execute instructions to perform the communication processing to be performed by the network function, on the packet whose destination address has been translated into an address belonging to the pseudo network address in response to formation of the predetermined group.

32. The network device according to claim 28, wherein the processor is further configured to execute instructions to perform the communication processing to be performed by the network function, on the packet to which an address belonging to the pseudo network address is added, wherein the predetermined group is formed of a plurality of types of the network functions.

33. The network device according to claim 28, wherein the processor is further configured to execute instructions to:
perform the communication processing to be performed by the network function, on the packet to which an address belonging to the pseudo network address formed of the network functions is added;
refer to a table including information indicating a forward destination corresponding to the address; and
forward the packet to the forward destination corresponding to the address.

34. The network device according to claim 28, wherein the processor is further configured to execute instructions to change a forward destination corresponding to the identification information in response to a change in a network function included in the predetermined group.

35. The network device according to claim 28, wherein the processor is further configured to execute instructions to change a forward destination corresponding to the identification information in response to a change in a connection structure of the network functions.

36. A communication method of a communication device, comprising:
storing identification information corresponding to a pseudo network address that is assigned to a predetermined group of network functions, wherein the predetermined group includes at least one network function assigned to each of user identifiers;
adding the identification information to a packet belonging to the predetermined group; and
sending the packet with the identification information added thereto to the predetermined group of network functions,
wherein packet forwarding within the predetermined group is performed based on the identification information, wherein different addresses belonging to the pseudo network address, as pseudo addresses, are assigned to different user identifiers to identify each user identifier within the predetermined group.

37. A control method of a control apparatus for controlling a communication device, comprising:
storing identification information corresponding to a pseudo network address that is assigned to a predetermined group of network functions, wherein the predetermined group includes at least one network function assigned to each of user identifiers;

instructing the communication apparatus to add the identification information to a packet belonging to the predetermined group; and instructing at least one network function in the predetermined group to perform packet forwarding within the predetermined group based on the identification information, wherein different addresses belonging to the pseudo network address, as pseudo addresses, are assigned to different user identifiers to identify each user identifier within the predetermined group.

38. A communication method of a network device, comprising:

storing a routing table which is used to forward a packet to a network function belonging to a predetermined group of network functions providing communication services, based on identification information corresponding to a pseudo network address that is assigned to a predetermined group of network functions, wherein the predetermined group includes at least one network function assigned to each of user identifiers;

performing communication processing on a packet to which the identification information is added, wherein the communication processing is performed by the network function; and forwarding the packet to another network function belonging to the predetermined group of network functions, based on the identification information, wherein different addresses belonging to the pseudo network address, as pseudo addresses, are assigned to different user identifiers to identify each user identifier within the predetermined group.

39. A non-transitory computer-readable medium that stores a program causing a computer to execute:

storing identification information corresponding to a pseudo network address that is assigned to a predetermined group of network functions, wherein the predetermined group includes at least one network function assigned to each of user identifiers;

instructing the communication apparatus to add the identification information to a packet belonging to the predetermined group; and instructing at least one network function in the predetermined group to perform packet forwarding within the predetermined group based on the identification information, wherein different addresses belonging to the pseudo network address, as pseudo addresses, are assigned to different user identifiers to identify each user identifier within the predetermined group.

40. A non-transitory computer-readable medium that stores a program causing a computer to execute:

storing a routing table which is used to forward a packet to a network function belonging to a predetermined group of network functions providing communication services, based on identification information corresponding to a pseudo network address that is assigned to a predetermined group of network functions, wherein the predetermined group includes at least one network function assigned to each of user identifiers;

performing communication processing on a packet to which the identification information is added, wherein the communication processing is performed by the network function; and forwarding the packet to another network function belonging to the predetermined group of network functions, based on the identification information, wherein different addresses belonging to the pseudo network address, as pseudo addresses, are assigned to different user identifiers to identify each user identifier within the predetermined group.

* * * * *